(12) United States Patent
Raghavan et al.

(10) Patent No.: US 11,601,245 B2
(45) Date of Patent: Mar. 7, 2023

(54) TECHNIQUES FOR IMPROVING ANGLE-BASED POSITIONING PROCEDURES IN ULTRA-WIDE BANDWIDTH SYSTEMS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 17/132,394

(22) Filed: Dec. 23, 2020

(65) Prior Publication Data
US 2022/0200756 A1 Jun. 23, 2022

(51) Int. Cl.
*H04W 24/00* (2009.01)
*H04W 52/16* (2009.01)
(Continued)

(52) U.S. Cl.
CPC ......... *H04L 5/0051* (2013.01); *H04B 7/0695* (2013.01); *H04B 17/318* (2015.01);
(Continued)

(58) Field of Classification Search
CPC . H04W 24/10; H04W 72/0413; H04W 88/02; H04W 72/042; H04W 88/08; H04W 24/02; H04W 24/08; H04W 72/06; H04W 24/00; H04W 52/244; H04W 72/04; H04W 72/0406; H04W 72/046; H04W 16/10; H04W 16/28; H04W 16/32; H04W 28/06; H04W 36/08; H04W 36/32; H04W 4/70; H04W 48/08; H04W 48/12; H04W 48/16; H04W 52/143; H04W 52/146; H04W 52/16; H04W 52/243; H04W 52/346; H04W 52/365; H04W 52/38;
(Continued)

(56) References Cited

U.S. PATENT DOCUMENTS 11,496,283 B2 * 11/2022 Oishi .................. H04L 25/0204
2018/0255603 A1 * 9/2018 Kim ........................ H04W 4/46
(Continued)

*Primary Examiner* — Joseph Arevalo
(74) *Attorney, Agent, or Firm* — Holland & Hart, LLP

(57) ABSTRACT

Methods, systems, and devices for wireless communications are described. A user equipment (UE) may be configured to perform positioning determination procedures, such as angle-based positioning procedures, with a base station to determine the position of the UE relative to the base station. To avoid positioning ambiguities that may result from antenna element spacing of an antenna module of the UE at some frequencies, such as mutual coupling or grating lobes, a UE may transmit a capability message indicating the capability of the UE related to the positioning procedures. In some cases, the UE may de-activate one or more antenna elements to increase the spacing between the antenna elements so as to mitigate mutual coupling when transmitting or receiving positioning reference signals. In some cases, the UE may request that the positioning reference signals be scheduled on some frequencies, not scheduled on other frequencies, or both.

30 Claims, 18 Drawing Sheets

(51) Int. Cl.
    *H04L 5/00* (2006.01)
    *H04W 4/029* (2018.01)
    *H04W 88/08* (2009.01)
    *H04B 7/06* (2006.01)
    *H04B 17/318* (2015.01)
    *H04W 16/14* (2009.01)

(52) U.S. Cl.
    CPC ........... *H04W 4/029* (2018.02); *H04W 16/14* (2013.01); *H04W 88/085* (2013.01)

(58) Field of Classification Search
    CPC ............... H04W 56/001; H04W 72/02; H04W 72/0426; H04W 72/0446; H04W 72/12; H04W 72/1231; H04W 72/1278; H04W 72/1289; H04W 72/14; H04W 74/0833; H04W 74/0875; H04W 76/20; H04W 76/27; H04W 84/005; H04W 84/02; H04W 88/04; H04W 88/085; H04W 88/12; H04W 92/18
    USPC ........ 370/329, 312, 281, 254, 280, 328, 252
    See application file for complete search history.

(56) References Cited

U.S. PATENT DOCUMENTS

2021/0396834 A1* 12/2021 Moon .................. G01S 3/48
2022/0317235 A1* 10/2022 Ye ..................... G01S 5/0268

\* cited by examiner

TECHNIQUES FOR IMPROVING ANGLE-BASED POSITIONING PROCEDURES IN ULTRA-WIDE BANDWIDTH SYSTEMS

FIELD OF TECHNOLOGY

The following relates to wireless communications, including techniques for improving angle-based positioning procedures in ultra-wide bandwidth systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may perform positioning determination procedures, such as angle-based positioning determination procedures, to determine a position of the UE relative to the base station. Such angle-based positioning determination procedures may include angle of departure (AoD) measurements, angle of arrival (AoA) measurements, or both. In some cases, such as at some frequencies, mutual coupling, or grating lobes, or both may occur that may impact the ability of the UE and the base station to determine the position of the UE relative to the base station.

SUMMARY

The described techniques relate to improved methods, systems, devices, and apparatuses that support techniques for improving angle-based positioning procedures in ultra-wide bandwidth systems. Generally, the described techniques provide for enhanced techniques for determining the position of a user equipment (UE) relative to a base station. In some implementations, a UE and a base station may perform positioning determination procedures, such as angle-based positioning determination procedures in which a UE may be configured to transmit and/or receive one or more positioning reference signals. To mitigate positioning ambiguities (e.g., due to mutual coupling, grating lobes) that may occur at some frequencies based on the inter-antenna element spacing of the antenna elements within a subarray of an antenna module (or modules) of the UE, a UE may be configured to determine the capability of the UE and to transmit, via a capability message, an indication of the capability of the UE, such as the ability to perform communications across a range of radio frequency spectrum bands (e.g., an ultra-wide bandwidth). The UE and/or the base station may perform one or more positioning ambiguity mitigation techniques based on the capability of the UE. Such positioning ambiguity mitigation techniques may include the UE de-activating one or more antenna elements to increase the inter-antenna element spacing of the active antenna elements within an antenna module of the UE. In some cases, the positioning ambiguity mitigation techniques may include a UE transmitting a request, to the base station, that positioning reference signals be scheduled in some frequencies that avoid positioning ambiguities. In some cases, the positioning ambiguity mitigation techniques may include a UE transmitting an indication of frequencies that avoid positioning ambiguities and/or transmitting on indication of frequencies in which positioning ambiguities may occur. The base station may schedule positioning reference signals to be transmitted by the UE or received by the UE based on the capability of the UE and/or based on information or requests transmitted by the UE.

A method for wireless communications at a UE is described. The method may include transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands, receiving control signaling indicating that the UE is configured to transmit a positioning reference signal to the base station on a first radio frequency spectrum band of the subset of radio frequency spectrum bands, de-activating one or more antenna elements of the antenna module based on a wavelength of the first radio frequency spectrum band and the inter-antenna element spacing, and transmitting the positioning reference signal via one or more active antenna elements of the antenna module.

An apparatus for wireless communications at a UE is described. The apparatus may include a processor, memory in electronic communication with the processor, and instructions stored in the memory. The instructions may be executable by the processor to cause the apparatus to transmit, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands, receive control signaling indicating that the UE is configured to transmit a positioning reference signal to the base station on a first radio frequency spectrum band of the subset of radio frequency spectrum bands, de-activate one or more antenna elements of the antenna module based on a wavelength of the first radio frequency spectrum band and the inter-antenna element spacing, and transmit the positioning reference signal via one or more active antenna elements of the antenna module.

Another apparatus for wireless communications at a UE is described. The apparatus may include means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands, means for receiving control signaling indicating that the UE is configured to transmit a positioning reference signal to the base station on a first radio frequency spectrum band of the subset of radio frequency spectrum bands, means for de-activating one or more antenna elements of the antenna module based on a wavelength of the first radio frequency spectrum band and the inter-antenna element spacing, and means for transmitting the positioning reference signal via one or more active antenna elements of the antenna module.

A non-transitory computer-readable medium storing code for wireless communications at a UE is described. The code may include instructions executable by a processor to transmit, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands, receive control signaling indicating that the UE is configured to transmit a positioning reference signal to the base station on a first radio frequency spectrum band of the subset of radio frequency spectrum bands, de-activate one or more antenna elements of the antenna module based on a wavelength of the first radio frequency spectrum band and the inter-antenna element spacing, and transmit the positioning reference signal via one or more active antenna elements of the antenna module.

Some examples of the method, apparatuses, and non-transitory computer-readable medium described herein may further include operations, features, means, or instructions for transmitting a request for the UE to increase transmission power of the positioning reference signal based on de-activating the one or more antenna elements.

Some examples of the method, apparatuses, and non-transitory computer-readable medium described herein may further include operations, features, means, or instructions for transmitting a request for the base station to transmit positioning reference signals to the UE using a set of radio frequency spectrum bands that may be different than the subset of radio frequency spectrum bands.

Some examples of the method, apparatuses, and non-transitory computer-readable medium described herein may further include operations, features, means, or instructions for identifying that the inter-antenna element spacing of the antenna module of the UE may be less than half the wavelength of the first radio frequency spectrum band and determining to increase the inter-antenna element spacing between active antenna elements of the antenna module of the UE by de-activating the one or more antenna elements based on the inter-antenna element spacing of the antenna module of the UE being less than half the wavelength of the first radio frequency spectrum band.

In some examples of the method, apparatuses, and non-transitory computer-readable medium described herein, transmitting the capability message may include operations, features, means, or instructions for transmitting an indication that mutual coupling will occur at the UE in the subset of radio frequency spectrum bands of the range of radio frequency spectrum bands based on the inter-antenna element spacing of the antenna module of the UE being less than half of the wavelength in at least the subset of radio frequency spectrum bands.

In some examples of the method, apparatuses, and non-transitory computer-readable medium described herein, transmitting the capability message may include operations, features, means, or instructions for transmitting an indication that the UE may be capable of communications across the range of radio frequency spectrum bands via a single antenna module of the UE.

In some examples of the method, apparatuses, and non-transitory computer-readable medium described herein, transmitting the capability message may include operations, features, means, or instructions for transmitting an indication that the UE may be capable of de-activating antenna elements of the antenna module of the UE.

A method for wireless communications at a UE is described. The method may include transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands, receiving control signaling indicating that the UE is configured to receive a positioning reference signal from the base station on a first radio frequency spectrum band of the subset of radio frequency spectrum bands, de-activating one or more antenna elements of the antenna module based on a wavelength of the first radio frequency spectrum band and the inter-antenna element spacing, and receiving the positioning reference signal via one or more active antenna elements of the antenna module.

An apparatus for wireless communications at a UE is described. The apparatus may include a processor, memory in electronic communication with the processor, and instructions stored in the memory. The instructions may be executable by the processor to cause the apparatus to transmit, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands, receive control signaling indicating that the UE is configured to receive a positioning reference signal from the base station on a first radio frequency spectrum band of the subset of radio frequency spectrum bands, de-activate one or more antenna elements of the antenna module based on a wavelength of the first radio frequency spectrum band and the inter-antenna element spacing, and receive the positioning reference signal via one or more active antenna elements of the antenna module.

Another apparatus for wireless communications at a UE is described. The apparatus may include means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands, means for receiving control signaling indicating that the UE is configured to receive a positioning reference signal from the base station on a first radio frequency spectrum band of the subset of radio frequency spectrum bands, means for de-activating one or more antenna elements of the antenna module based on a wavelength of the first radio frequency spectrum band and the inter-antenna element spacing, and means for receiving the positioning reference signal via one or more active antenna elements of the antenna module.

A non-transitory computer-readable medium storing code for wireless communications at a UE is described. The code may include instructions executable by a processor to transmit, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands, receive control signaling indicating that the UE is configured to receive a positioning reference signal from the base station on a first radio frequency spectrum band of the subset of radio frequency spectrum bands, de-activate one or more antenna elements of the antenna module based on a wavelength of the first radio frequency spectrum band and the inter-antenna element spacing, and receive the positioning reference signal via one or more active antenna elements of the antenna module.

Some examples of the method, apparatuses, and non-transitory computer-readable medium described herein may further include operations, features, means, or instructions for transmitting a request for the base station to increase transmission power of the positioning reference signal based on de-activating the one or more antenna elements.

Some examples of the method, apparatuses, and non-transitory computer-readable medium described herein may further include operations, features, means, or instructions for transmitting a request for the base station to transmit positioning reference signals to the UE using a set of radio frequency spectrum bands that may be different than the subset of radio frequency spectrum bands.

Some examples of the method, apparatuses, and non-transitory computer-readable medium described herein may further include operations, features, means, or instructions for identifying that the inter-antenna element spacing of the antenna module of the UE may be less than half the wavelength of the first radio frequency spectrum band and determining to increase the inter-antenna element spacing between active antenna elements of the antenna module of the UE by de-activating the one or more antenna elements based on the inter-antenna element spacing of the antenna module of the UE being less than half the wavelength of the first radio frequency spectrum band.

Some examples of the method, apparatuses, and non-transitory computer-readable medium described herein may further include operations, features, means, or instructions for measuring a signal strength of the positioning reference signal received via the one or more active antenna elements of the antenna module and transmitting the signal strength of the positioning reference signal for downlink angle of departure estimation.

Some examples of the method, apparatuses, and non-transitory computer-readable medium described herein may further include operations, features, means, or instructions for receiving, from a location management function, communications information associated with the positioning reference signal received by the UE, the communications information including a beam shape, a beam pattern, a peak or boresight direction of array gain, or an array gain pattern as a function of angles, or a combination thereof.

In some examples of the method, apparatuses, and non-transitory computer-readable medium described herein, transmitting the capability message may include operations, features, means, or instructions for transmitting an indication that mutual coupling will occur at the UE in the subset of radio frequency spectrum bands of the range of radio frequency spectrum bands based on the inter-antenna element spacing of the antenna module of the UE being less than half of the wavelength in at least the subset of radio frequency spectrum bands.

In some examples of the method, apparatuses, and non-transitory computer-readable medium described herein, transmitting the capability message may include operations, features, means, or instructions for transmitting an indication that the UE may be capable of communications across the range of radio frequency spectrum bands via a single antenna module of the UE.

In some examples of the method, apparatuses, and non-transitory computer-readable medium described herein, transmitting the capability message may include operations, features, means, or instructions for transmitting an indication that the UE may be capable of de-activating antenna elements of the antenna module of the UE.

A method for wireless communications at a UE is described. The method may include transmitting, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands, transmitting, to the base station, a request for the base station to transmit positioning reference signals to the UE using a set of radio frequency spectrum bands that is different than the subset of radio frequency spectrum bands, and receiving, from the base station, a first positioning reference signal via a first radio frequency spectrum band based on the request, where the first radio frequency spectrum band is included in the set of radio frequency spectrum bands.

An apparatus for wireless communications at a UE is described. The apparatus may include a processor, memory in electronic communication with the processor, and instructions stored in the memory. The instructions may be executable by the processor to cause the apparatus to transmit, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands, transmit, to the base station, a request for the base station to transmit positioning reference signals to the UE using a set of radio frequency spectrum bands that is different than the subset of radio frequency spectrum bands, and receive, from the base station, a first positioning reference signal via a first radio frequency spectrum band based on the request, where the first radio frequency spectrum band is included in the set of radio frequency spectrum bands.

Another apparatus for wireless communications at a UE is described. The apparatus may include means for transmitting, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands, means for transmitting, to the base station, a request for the base station to transmit positioning reference signals to the UE using a set of radio frequency spectrum bands that is different than the subset of radio frequency spectrum bands, and means for receiving, from the base station, a first positioning reference signal via a first radio frequency spectrum band based on the request, where the first radio frequency spectrum band is included in the set of radio frequency spectrum bands.

A non-transitory computer-readable medium storing code for wireless communications at a UE is described. The code may include instructions executable by a processor to transmit, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands, transmit, to the base station, a request for the base station to transmit positioning reference signals to the UE using a set of radio frequency spectrum bands that is different than the subset of radio frequency spectrum bands, and receive, from the base station, a first positioning reference signal via a first radio frequency spectrum band based on the request, where the first radio frequency spectrum band is included in the set of radio frequency spectrum bands.

Some examples of the method, apparatuses, and non-transitory computer-readable medium described herein may further include operations, features, means, or instructions for measuring a signal strength of the first positioning reference signal received via the first radio frequency spectrum band and transmitting the signal strength of the first positioning reference signal for downlink angle of departure estimation.

Some examples of the method, apparatuses, and non-transitory computer-readable medium described herein may further include operations, features, means, or instructions for receiving, from the base station, a second positioning reference signal via a second radio frequency spectrum band, where the second radio frequency spectrum band may be included in the subset of radio frequency spectrum bands.

Some examples of the method, apparatuses, and non-transitory computer-readable medium described herein may further include operations, features, means, or instructions for measuring a signal strength of the first positioning reference signal received via the first radio frequency spectrum band and a signal strength of the second positioning reference signal received via the second radio frequency spectrum band and transmitting the signal strength of the first positioning reference signal and the signal strength of the second positioning reference signal for downlink angle of departure estimation.

Some examples of the method, apparatuses, and non-transitory computer-readable medium described herein may further include operations, features, means, or instructions for measuring a signal strength of the first positioning reference signal received via the first radio frequency spectrum band or a signal strength of the second positioning reference signal received via the second radio frequency spectrum band, or both, measuring a time-difference of arrival (TDoA) of the first positioning reference signal, a TDoA of the second positioning reference signal, or both, and transmitting an indication of a position of the UE relative to the base station based on the signal strength of the first positioning reference signal, the signal strength of the second positioning reference signal, the TDoA of the first positioning reference signal, the TDoA of the second positioning reference signal, or a combination thereof.

Some examples of the method, apparatuses, and non-transitory computer-readable medium described herein may further include operations, features, means, or instructions for receiving, from a location management function, communications information associated with the first positioning reference signal, or the second positioning reference signal, or both, the communications information including a beam shape, a beam pattern, a peak or boresight direction of array gain, or an array gain pattern as a function of spatial angles, or a combination thereof.

In some examples of the method, apparatuses, and non-transitory computer-readable medium described herein, transmitting the capability message may include operations, features, means, or instructions for transmitting an indication that beam weights used at the UE will result in grating lobes in the subset of radio frequency spectrum bands of the range of radio frequency spectrum bands based on the inter-antenna element spacing of the antenna module of the UE being greater than half of the wavelength in at least the subset of radio frequency spectrum bands.

In some examples of the method, apparatuses, and non-transitory computer-readable medium described herein, transmitting the capability message may include operations, features, means, or instructions for transmitting an indication that the UE may be capable of communications across the range of radio frequency spectrum bands via a single antenna module of the UE.

A method for wireless communications at a network device is described. The method may include receiving a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands, receiving, from the UE, a request for the network device to transmit positioning reference signals to the UE using a set of radio frequency spectrum bands that is different than the subset of radio frequency spectrum bands, and transmitting, to the UE, a first positioning reference signal via a first radio frequency spectrum band based on the request, where the first radio frequency spectrum band is included in the set of radio frequency spectrum bands.

An apparatus for wireless communications at a network device is described. The apparatus may include a processor, memory in electronic communication with the processor, and instructions stored in the memory. The instructions may be executable by the processor to cause the apparatus to receive a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands, receive, from the UE, a request for the network device to transmit positioning reference signals to the UE using a set of radio frequency spectrum bands that is different than the subset of radio frequency spectrum bands, and transmit, to the UE, a first positioning reference signal via a first radio frequency spectrum band based on the request, where the first radio frequency spectrum band is included in the set of radio frequency spectrum bands.

Another apparatus for wireless communications at a network device is described. The apparatus may include means for receiving a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands, means for receiving, from the UE, a request for the network device to transmit positioning reference signals to the UE using a set of radio frequency spectrum bands that is different than the subset of radio frequency spectrum bands, and means for transmitting, to the UE, a first positioning reference signal via a first radio frequency spectrum band based on the request, where the first radio frequency spectrum band is included in the set of radio frequency spectrum bands.

A non-transitory computer-readable medium storing code for wireless communications at a network device is described. The code may include instructions executable by a processor to receive a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands, receive, from the UE, a request for the network device to transmit positioning reference signals to the UE using a set of radio frequency spectrum bands that is different than the subset of radio frequency spectrum bands, and transmit, to the UE, a first positioning reference signal via a first radio frequency spectrum band based on the request, where the first radio frequency spectrum band is included in the set of radio frequency spectrum bands.

Some examples of the method, apparatuses, and non-transitory computer-readable medium described herein may further include operations, features, means, or instructions for transmitting, to the UE, a second positioning reference signal via a second radio frequency spectrum band, where the second radio frequency spectrum band may be included in the subset of radio frequency spectrum bands.

Some examples of the method, apparatuses, and non-transitory computer-readable medium described herein may further include operations, features, means, or instructions for receiving an indication of a position of the UE relative to the network device based on a signal strength of the first positioning reference signal, a signal strength of the second positioning reference signal, a TDoA of the first positioning reference signal, a TDoA of the second positioning reference signal, or a combination thereof.

In some examples of the method, apparatuses, and non-transitory computer-readable medium described herein, receiving the capability message may include operations, features, means, or instructions for receiving an indication that beam weights used at the UE will result in grating lobes in the subset of radio frequency spectrum bands of the range of radio frequency spectrum bands based on the inter-antenna element spacing of the antenna module of the UE being greater than half of the wavelength in at least the subset of radio frequency spectrum bands.

In some examples of the method, apparatuses, and non-transitory computer-readable medium described herein, receiving the capability message may include operations, features, means, or instructions for receiving an indication that mutual coupling will occur at the UE in a second subset of radio frequency spectrum bands of the range of radio frequency spectrum bands based on the inter-antenna element spacing of the antenna module of the UE being less than half of the wavelength in at least the second subset of radio frequency spectrum bands and transmitting, to the UE, the first positioning reference signal via the first radio frequency spectrum band based on the indication that mutual coupling will occur at the UE in the second subset of radio frequency spectrum bands, the first radio frequency spectrum band included in the set of radio frequency spectrum bands different from the second subset of radio frequency spectrum bands.

In some examples of the method, apparatuses, and non-transitory computer-readable medium described herein, receiving the capability message may include operations, features, means, or instructions for receiving an indication that the UE may be capable of communications across the range of radio frequency spectrum bands via a single antenna module of the UE.

DETAILED DESCRIPTION

Figure 1:
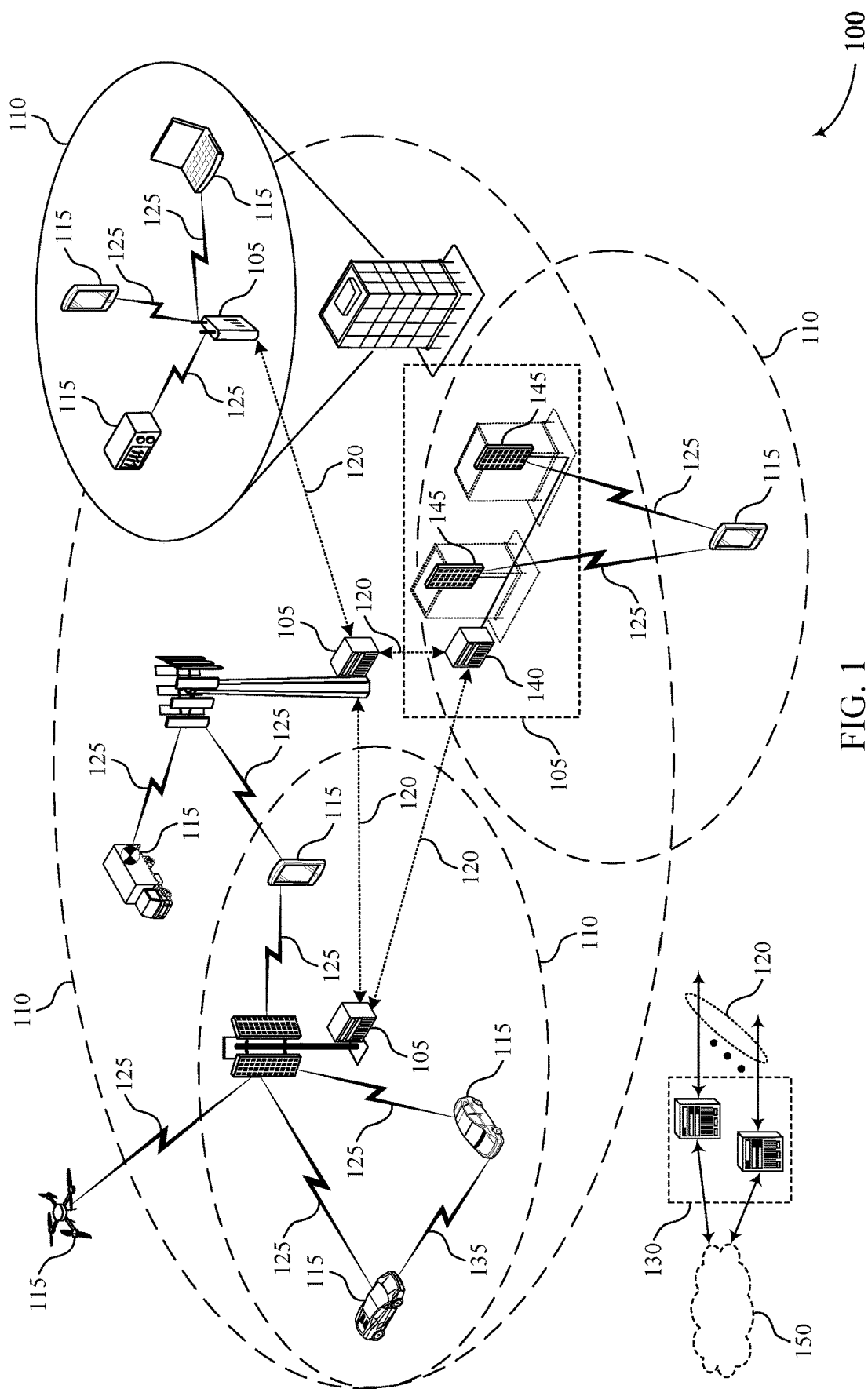
FIG. 1 illustrates an example of a wireless communications system that supports techniques for improving angle-based positioning procedures in ultra-wide bandwidth systems in accordance with aspects of the present disclosure.

In some wireless communications systems, a user equipment (UE) and a base station may perform positioning determination procedures, such as angle-based positioning procedures to determine a position of the UE relative to the base station. Such angle-based determination procedures may include a UE transmitting positioning reference signals to the base station (e.g., uplink angle of arrival (AoA)-based positioning), or the base station transmitting positioning reference signals to the UE (e.g., downlink angle of departure (AoD)-based positioning), where the base station, or UE, or both may determine the position of the UE relative to the base station based on the positioning reference signals.

The UE may transmit or receive the positioning reference signals via one or more antenna elements of an antenna module of the UE. In some cases, a UE may be configured with an antenna module that is capable of communications across a range of radio frequency spectrum bands (e.g., an ultra-wide bandwidth), where the inter-antenna element spacing of the antenna elements of the antenna module may be fixed (e.g., physically fixed). The inter-antenna element spacing of the antenna module of the UE may impact the ability of the UE to transmit or receive positioning reference signals (or any other signal) at some frequencies and may thus impact the ability of the UE and/or base station to determine the relative position of the UE at such frequencies. For example, when the inter-antenna element spacing is equal or near equal to the wavelength of a signal divided by 2 (e.g., $\lambda/2$), the UE may reliably transmit or receive the signal (e.g., without positioning ambiguities). However, when the inter-antenna element spacing is less than $\lambda/2$, mutual coupling may occur between the antenna elements of the antenna module of the UE. Further, when the inter-antenna element spacing is greater than $\lambda/2$, beamforming at the UE end may lead to transmit and/or receive grating lobes in addition to the main lobe at which the intended signal is transmitted/received. Such mutual coupling and grating lobes may adversely impact the ability of the UE to transmit or receive such signals, such as positioning reference signals and may impact the ability of the base station and/or the UE to determine the relative position of the UE.

To mitigate positioning ambiguities (e.g., those caused by mutual coupling or grating lobes) that may occur at some frequencies due to the inter-antenna element spacing of the antenna module (or modules) of the UE, a UE may be configured to determine the capability of the UE and to transmit, via a capability message, an indication of the capability of the UE, such as the ability to perform communications across a range of radio frequency spectrum bands (e.g., ultra-wide bandwidth) via an antenna module (e.g., a single antenna module). The UE and/or the base station may perform one or more positioning ambiguity mitigation techniques based on the capability message.

In some cases, the UE may be configured to determine whether the inter-antenna element spacing of the antenna elements in the antenna module of the UE is less than, equal to, or greater than a threshold, such as half the wavelength of a signal (e.g., $\lambda/2$). If the UE determines that the inter-antenna element spacing is less than $\lambda/2$, the UE may be configured to de-activate one or more antenna elements of the UE to increase the inter-antenna element spacing to $\lambda/2$ (or near $\lambda/2$, or to a close approximation to $\lambda/2$ based on the antenna-level capabilities within the antenna module). In some cases, if the UE determines that the inter-antenna element spacing is less than or greater than $\lambda/2$, the UE may be configured to request that positioning reference signals be scheduled in some frequencies in which positioning ambiguities (e.g., grating lobes) may not occur. In some cases, the base station may schedule a positioning reference signal on one of the frequencies in which positioning ambiguities may not occur based on the received request or based on the received capability message, or both. In some cases, the base station may schedule multiple positioning reference signals in the requested frequencies, or non-requested frequencies, or both. The UE, or base station, or both may combine the results of the multiple positioning reference signals to resolve positioning ambiguities. In some cases, if the UE and/or base station determines that the inter-element spacing is less than or greater than $\lambda/2$, the UE may be configured to perform one or more other positioning determination methods (e.g., time difference of arrival (TDoA)) in combination with or as an alternative to the angle-based positioning methods.

Particular aspects of the subject matter described herein may be implemented to realize one or more advantages. The described techniques may support improvements in determining the relative position of a UE via angle-based positioning methods. The described techniques may improve reliability, improve efficiency, and decrease latency among other advantages. As such, supported techniques may include improved network operations and, in some examples, may promote network efficiencies, among other benefits.

Aspects of the disclosure are initially described in the context of wireless communications systems. Aspects are then described with reference to process flows. Aspects of the disclosure are further illustrated by and described with reference to apparatus diagrams, system diagrams, and flowcharts that relate to techniques for improving angle-based positioning procedures in ultra-wide bandwidth systems.

FIG. 1 illustrates an example of a wireless communications system 100 that supports techniques for improving angle-based positioning procedures in ultra-wide bandwidth systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems 100, a UE 115 and a base station 105 may perform positioning determination procedures, such as angle-based positioning determination procedures in which a UE 115 may be configured to transmit and/or receive one or more positioning reference signals. To mitigate positioning ambiguities (e.g., mutual coupling, grating lobes) that may occur at some frequencies due to the inter-antenna element spacing of the antenna module (or modules) of the UE 115, a UE 115 may be configured to determine the capability of the UE 115 and to transmit to the base station 105, via a capability message, the capability of the UE 115, such as the ability to perform communications across a range of radio frequency spectrum bands (e.g., an ultra-wide bandwidth such as a bandwidth of 14 GHz or more, or some other frequency range as the ultra-wide bandwidth may not be limited to the bandwidth of 14 GHz or more). The UE 115 and/or the base station 105 may perform one or more positioning ambiguity mitigation techniques based on the capability message. Such positioning ambiguity mitigation techniques may include the UE 115 de-activating one or more antenna elements to increase the inter-antenna element spacing across the active antenna elements of the antenna module of the UE 115. In some cases, the positioning ambiguity mitigation techniques may include a UE 115 transmitting a request, to the base station 105, that positioning reference signals be scheduled in some frequencies that avoid positioning ambiguities or otherwise indicating frequencies that avoid positioning ambiguities. The base station 105 may schedule positioning reference signals to be transmitted by the UE 115 or received by the UE 115 based on the capability message and/or based on the request.

Figure 2:
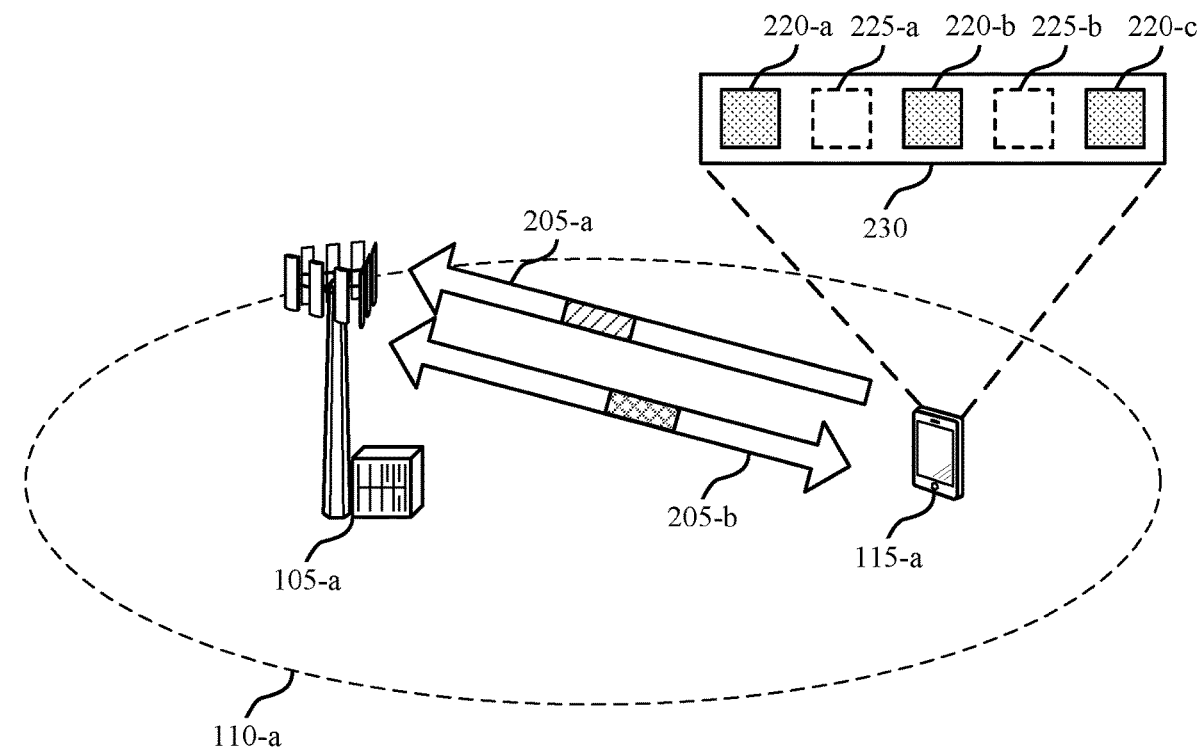
FIGS. 2 and 3 illustrate examples of wireless communications systems that support techniques for improving angle-based positioning procedures in ultra-wide bandwidth systems in accordance with aspects of the present disclosure.

FIG. 2 illustrates an example of a wireless communications system 200 that supports techniques for improving angle-based positioning procedures in ultra-wide bandwidth systems in accordance with aspects of the present disclosure. The wireless communications system 200 may include base station 105-a and UE 115-a, which may be examples of a base station 105 and UEs 115 as described with reference to FIG. 1. Base station 105-a may serve a geographic coverage area 110-a. In some cases, UE 115-a may implement a positioning ambiguity mitigation procedure. For example, UE 115-a may de-activate one or more antenna elements of the antenna module of UE 115-a to mitigate positioning ambiguities. Additionally or alternatively, other wireless devices, such as base station 105-a, may implement a positioning ambiguity mitigation procedure.

UE 115-a and base station 105-a may be in communications with one another. For example, UE 115-a may transmit one or more signals to base station 105-a via communication link 205-a, which may be an uplink communications link. In some cases, UE 115-a may additionally transmit one or more signals to base station 105-a via communication link 205-b, which may be an uplink communications link. In some cases, base station 105-a may transmit signals to UE 115-a via communication link 205-b, which may be a downlink communications link. For example, UE 115-a, or base station 105-a, or both may transmit signals, such as reference signals 215 (e.g., positioning reference signals) to base station 105-a, or UE 115-a, respectively as part of a positioning procedure. The positioning procedure may serve to determine the position of UE 115-a relative to base station 105-a.

In some implementations, UE 115-a and base station 105-a may perform angle-based positioning procedures such as AoA procedures and AoD procedures (and/or zenith of arrival (ZoA) and zenith of departure (ZoD) procedures). Such angle-based procedures may include the estimation of AoD of signals transmitted by base station 105-a (e.g., downlink AoD), estimation of AoD of signals transmitted by UE 115-a (e.g., uplink AoD), estimation of AoA of signals transmitted by UE 115-a (e.g., uplink AoA), or estimation of AoA of signals transmitted by base station 105-a (e.g., downlink AoA), or a combination thereof. The signals transmitted by base station 105-a or UE 115-a may be reference signals 215, such as positioning reference signals. Base station 105-a, or UE 115-a, or some other network entity (e.g., a location management function (LMF), positioning server, positioning engine) may determine the position of UE 115-a relative to base station 105-a based on the positioning reference signals.

For example, a downlink AoD procedure may include base station 105-a transmitting one or more reference signals 215 (e.g., positioning reference signals) to UE 115-a. In some cases, UE 115-a may measure a signal strength or quality (e.g., reference signal received power (RSRP)) of the one or more received reference signals 215, which UE 115-a may report to base station 105-a, or to the LMF, or both in a UE-assisted downlink AoD procedure. Base station 105-a, or the LMF, or both may use the received measurements to estimate the downlink AoD of the one or more reference signals 215. If the LMF determines the downlink AoD of the one or more reference signals 215, the LMF may indicate the downlink AoD of the one or more reference signals to base station 105-a, or UE 115-a, or both. Additionally or alternatively to a UE-assisted downlink AoD procedure, a UE-based downlink AoD procedure may be used to determine the AoD of the one or more reference signals 215 transmitted by base station 105-a. In a UE-based procedure, the LMF or base station 105-a may indicate, to UE 115-a, the beam shapes, or some other beam-related parameters (e.g., beam pattern, peak direction or boresight direction of beam, array gain pattern as a function of angles) associated with transmitting the one or more reference signals. The beam-related parameters may include the beam's boresight direction (e.g., a direction along the spatial axis captured by the local coordinate system of a directional antenna array), array gain pattern as a function of spatial angles, etc. UE 115-a may use the indicated beam shapes and/or beam-related parameters to determine the downlink AoD of the one or more positioning reference signals. UE 115-a may indicate the determined downlink AoD of the one or more positioning reference signals to base station 105-a, the LMF, or both. In some cases, base station 105-a may receive the beam shapes, or some other beam-related parameters associated with transmitting the one or more reference signals from the LMF, and base station 105-a may determine the downlink AoD of the one or more positioning reference signals based on the received beam-related information, or based on the determined downlink AoD of the one or more positioning reference signals from UE 115-a, or a combination thereof. Beam-related information (e.g., beam shapes) of the transmitting positioning reference signals in addition to the measured RSRPs of the received positioning reference signals may allow UE 115-a, base station 105-a, of the LMF, or a combination thereof to determine the downlink AoD of the one or more reference signals 215 and determine the relative position of UE 115-a.

In another example, an uplink AoA procedure may include UE 115-a transmitting one or more reference signals 215 (e.g., positioning reference signals) to base station 105-a. Base station 105-a may receive and measure the signal strength or quality (e.g., RSRP) of the one or more reference signals 215. In some cases, base station 105-a may use the measurements to determine the uplink AoA of the one or more reference signals 215. Base station 105-a may indicate the one or more RSRP measurements and/or the uplink AoA determinations to the LMF, or UE 115-a, or both. Base station 105-a may report the estimated uplink AoA of the one or more reference signals 215 to the LMF in global coordinate system (GCS) or local coordinate system (LCS), where reporting may be based on the azimuth and elevation of the reference signals 215. In some cases, base station 105-a may report the one or more RSRP measurements to the LMF and the LMF may use the one or more RSRP measurements to determine the uplink AoA of the one or more reference signals 215. The LMF may indicate the determined AoA of the one or more reference signals 215 to base station 105-a, or UE 115-a, or both. UE-based and UE-assisted techniques may be used for uplink and/or downlink approaches to estimate AoA and/or AoD of signals transmitted by the UE 115 and/or base station 105.

UE 115-a and base station 105-a may each be configured with one or more antenna modules 230 that each include one or more antenna elements (e.g., an antenna array), where UE 115-a and base station 105-a may each use one or more of the antenna modules 230 to receive and/or transmit signals, such as reference signals 215 or data signals. Antenna elements of an antenna module 230 may be arranged in an array with some distance in between each antenna element (e.g., inter-antenna element spacing). The inter-antenna element spacing between each antenna element in an array may be uniform or may be different between one or more pairs of antenna elements. Antenna elements within an antenna array of an antenna module 230 may be arranged in any configuration, shape, etc., with any amount of distance in between each antenna element. The configuration of antenna elements of an antenna module 230 may be fixed physically.

In some implementations, antenna modules 230 may be frequency specific such that each antenna module is configured to operate in a certain frequency range. As such, UE 115-a and base station 105-a may use a certain antenna module 230 to transmit or receive signals based on the frequency over which the signal is being transmitted. For example, antenna elements within an antenna module 230 may be arranged based on the frequency range the antenna module will operate in. For example, the inter-antenna element spacing between each antenna element in an antenna module 230 may be based on the wavelength $\lambda$ (e.g., median wavelength, average wavelength) associated with the corresponding frequency range of the antenna module 230. An inter-antenna element spacing equal to or near $\lambda/2$ may result in signals with minimized interference. As such, antenna modules may be configured with an inter-antenna element spacing equal to or near $\lambda/2$ for a certain frequency or frequency range.

In some implementations, a device, such as UE 115-a or base station 105-a may be configured with an antenna module 230 that UE 115-a may use across a wide frequency range, that may include mmW frequencies (e.g., an ultra-wide bandwidth such as 24 to 48 GHz, 52.6 to 114.25 GHz, 52.6 to 71 GHz) to reduce the number of antenna modules 230 a device is configured with. For example, UE 115-a may be configured with at least antenna module 230 including five antenna elements, where the antenna module 230 is capable of communicating across a wide frequency range. However, because the antenna elements in the antenna module 230 are physically fixed and because the antenna module is configured to operate in a wide frequency range, inter-antenna element spacing of the antenna elements in the antenna module 230 may be equal to or near equal to $\lambda/2$ at some frequencies, greater than $\lambda/2$ at some other frequencies, and less than $\lambda/2$ at some other frequencies. For example, the antenna elements of the antenna module 230 may be spaced apart with a distance of 2.5 mm between each antenna element. At 60 GHz, $\lambda/2$ is equal to 2.5 mm. However, at 30 GHz, the inter-antenna element spacing of 2.5 mm may instead be equal to 214. Thus, at 30 GHz, the inter-antenna element spacing may be less than $\lambda/2$. In another example, the antenna elements of the antenna module 230 may be spaced apart with a distance of 5 mm between each antenna element. At 30 GHz, $\lambda/2$ is equal to 5 mm. At 60 GHz, the inter-antenna element spacing of 5 mm may instead be equal to $\lambda$. Thus, at 60 GHz, the inter-antenna element spacing may be greater than $\lambda/2$.

When inter-antenna element spacing is less than $\lambda/2$, mutual coupling between the antenna elements may occur. Mutual coupling may be based on antenna array configuration, spacing between antenna elements, and phase shifts applied at each antenna element. For example, mutual coupling may result due to antenna elements being spaced closely together which may cause the transmissions and/or receptions of one antenna element to interfere with that of a neighboring antenna element. Mutual coupling may be associated with antenna elements that are within a half wavelength at the carrier frequency of interest. The amount of mutual coupling may decrease as inter-antenna element spacing increases. In some cases, mutual coupling may lead to beam pattern distortions and may lead to positioning ambiguities if angle-based methods are being used to determine the position of the UE 115.

When inter-antenna element spacing is greater than $\lambda/2$, grating lobes may occur. A grating lobe may refer to a secondary lobe with a strong array gain (e.g., a secondary peak in the beam pattern) that is comparable with the main lobe. For example, a grating lobe may be viewed as a side lobe with an array gain that is equal to or near equal to the array gain of the main lobe (e.g., with/without elemental gain incorporated). The grating lobe may be directed according to a different angle than the main lobe. Multiple grating lobes may be seen (e.g., by a transmitting and/or receiving device) if the inter-antenna element spacings associated with a transmitting device are larger than $\lambda$ spacing. A device (e.g., UE 115-a, base station 105-a) may attempt to receive a signal, where the signal may be (unknowingly to the device) be transmitted with a beam pattern that includes a main lobe directed according to a first angle and includes one or more grating lobes that are directed according to one or more other angles. Because the receiving device may identify one or more lobes with large array gains but each directed according to a different angle, the receiving device may be unable to determine the main lobe and thus the angle (e.g., direction) of the main lobe (e.g., AoD or AoA of the main lobe). As the receiving device may be unable to determine the direction of the main lobe, positioning ambiguities may result, where the receiving device may be unable to, or have difficulty in determining the relative position of the transmitting device to the receiving device, or vice versa. Grating lobes may also lead to ambiguities with beam management, beam refinement, unintended uplink interference, and poor beam design.

In some implementations, to mitigate positioning ambiguities that may result due to the inter-antenna element spacing of an antenna module 230, a transmitting device (e.g., UE 115-a, base station 105-a, a transmission reception point (TRP), a customer premises equipment (CPE), a relay node, a smart repeater node, a radio frequency (RF) repeater node, an integrated access and backhaul (IAB) node) or a receiving device (e.g., UE 115-a, base station 105-a, a TRP, a CPE, a relay node, a smart repeater node, an RF repeater node, an IAB node) may be configured to determine at which frequencies mutual coupling, grating lobes, or both may occur due to the transmitter's antenna module and/or due to the receivers antenna module. The transmitting device or receiving device may determine at which frequencies, the inter-antenna element spacing of an antenna module at the transmitting device and/or the receiving device is equal to $\lambda/2$. In some cases, the transmitting device may indicate the capability of the transmitting device to the receiving device via a capability message 210. In some cases, the receiving device may indicate the capability of the receiving device to the transmitting device via a capability message 210. The transmitting device, or the receiving device, or both may utilize the capability message 210 to determine the frequencies at which grating lobes may occur, to determine the frequencies at which mutual coupling may occur, or to determine the frequencies at which grating lobes or mutual coupling may not occur, or a combination thereof.

In some cases, based on the capability of the device, the device may be able to de-activate one or more antenna elements of an antenna module 230 of the device for a duration to increase the inter-antenna element spacing of the antenna module. For example, the device may de-activate one or more antenna elements of an antenna module 230 of the device at frequencies in which mutual coupling may have occurred (e.g., due to the original inter-antenna element spacing) to increase the inter-antenna element spacing of the active antenna elements of the antenna module 230 to be equal to or near equal to $\lambda/2$ at such frequencies.

For example, UE 115-a may identify and transmit an indication, to base station 105-a, that UE 115-a is capable of communications across a range of radio frequency spectrum bands (e.g., an ultra-wide bandwidth), where the indication may be transmitted via a capability message 210 over communications link 205-a. In some cases, UE 115-a may identify and transmit an indication, to base station 105-a, that UE 115-a is configured with an antenna module 230 that is capable of communications across the range of radio frequency spectrum bands (e.g., the ultra-wide bandwidth), where the indication may be transmitted via a capability message 210 over communications link 205-a. In some implementations, UE 115-a may determine at which frequencies (e.g., a first set of frequencies) UE 115-a will experience or cause mutual coupling due to the inter-antenna element spacing of the antenna module 230 of UE 115-a. In some implementations, UE 115-a may determine at which frequencies (e.g., a second set of frequencies) UE 115-a will experience or cause grating lobes due to the inter-antenna element spacing of the antenna module 230 of UE 115-a. In some implementations, UE 115-a may determine at which frequencies (e.g., a third set of frequencies) the inter-antenna element spacing of the antenna module 230 of UE 115-a is equal to or near equal to $\lambda/2$, such that UE 115-a may not experience or cause mutual coupling or grating lobes. UE 115-a may be configured to include in the capability message 210 an indication of the first set of frequencies, the second set of frequencies, or the third set of frequencies, or a combination thereof. In some implementations, UE 115-a may be configured to include in the capability message 210 an indication of the inter-antenna element spacing, antenna element configuration, etc. of the antenna module 230 of UE 115-a. In some cases, UE 115-a may be configured to include in the capability message 210 an indication that UE 115-a is capable of de-activating one or more antenna elements of the antenna module 230 of UE 115-a.

Base station 105-a may receive the capability message and schedule UE 115-a to transmit or receive positioning reference signals in a first frequency range (e.g., a first radio frequency spectrum band). In some cases, base station 105-a may schedule the positioning reference signals in the first frequency range based on mutual coupling and grating lobes not occurring in the first frequency band due to the inter-antenna element spacing of the base station's 105 antenna module 230, or the UE's 115 antenna module 230, or both. In some cases, base station 105-a may transmit, to UE 115-a, control signaling via a downlink communications link that UE 115-a is configured to transmit a positioning reference signal to base station 105-a on a first radio frequency spectrum band. In some cases, base station 105-a may transmit, to UE 115-a, control signaling via a downlink communications link that UE 115-a is configured to receive a positioning reference signal from base station 105-a on a first radio frequency spectrum band. In either case, UE 115-a may determine whether mutual coupling or grating lobes will occur at the first radio frequency spectrum band. For example, UE 115-a may determine whether the first radio frequency spectrum band is in the first set of frequencies, the second set of frequencies, or the third set of frequencies.

If UE 115-a determines that the first radio frequency spectrum band is in the third set of frequencies, UE 115-a may transmit or receive the positioning reference signal using each antenna element of the antenna module 230. If UE 115-a determines that the first radio frequency spectrum band is in the first set of frequencies, UE 115-a may determine to de-activate one or more antenna elements of the antenna module 230 so as to mitigate mutual coupling. UE 115-a may determine the value of $\lambda/2$ at the first radio frequency spectrum band and UE 115-a may de-activate antenna elements of the antenna module 230 to achieve an inter-antenna element spacing equal to or near equal to the determined $\lambda/2$ associated with the first radio frequency spectrum band. For example, the inter-antenna element spacing between antenna elements 220-a, 225-a, 220-b, 225-b, and 225-c may be equal to 2.5 mm. UE 115-a may determine that the value of $\lambda/2$ at the first radio frequency spectrum band is equal to 5 mm. As 2.5 mm is less than 5 mm, mutual coupling may occur at the first radio frequency spectrum band if the inter-antenna element spacing remains 2.5 mm. However, because UE 115-a is capable of de-activating antenna elements, UE 115-a may de-activate antenna elements 225-a and 225-b to increase the inter-antenna element spacing to be equal to or near equal to the $\lambda/2$ value of 5 mm. As such, antenna module 230 may include active antenna elements 220-a, 220-b, and 220-c, which UE 115-a may use to transmit and/or receive the positioning reference signals and may include de-activated antenna elements 225-a and 225-b which may not be used to transmit and/or receive reference signals 215. If scheduled to transmit the positioning reference signal, UE 115-*a* may transmit the reference signal 215 to base station 105-*a* via communications link 205-*b* (e.g., an uplink communications link) using active antenna elements 220-*a*, 220-*b*, and 220-*c*. If scheduled to receive the positioning reference signal, UE 115-*a* may receive the reference signal 215 from base station 105-*a* via communications link 205-*b* (e.g., a downlink communications link) using active antenna elements 220-*a*, 220-*b*, and 220-*c*.

In some cases, UE 115-*a* may transmit an indication to base station 105-*a* indicating which antenna elements are active (e.g., active antenna elements 220), or which antenna elements UE 115-*a* de-activated (e.g., de-activated antenna elements 225), or both. Additionally or alternatively, UE 115-*a* may indicate which antenna elements of the antenna module 230 UE 115-*a* may use to transmit and/or receive the positioning reference signal.

De-activated antenna elements 225-*a* and 225-*b* may remain de-activated until UE 115-*a* has completed receiving and/or transmitting the positioning reference signal in the first radio frequency spectrum band or until UE 115-*a* is scheduled to transmit and/or receive a positioning reference signal on a radio frequency spectrum band that is different from the first radio frequency spectrum band, or that is not in the first set of frequencies, or both.

In some cases, de-activating one or more antenna elements of the antenna module 230 may decrease the array gain of the antenna module 230 and may increase the beam-width. As such, UE 115-*a* may be dynamically configured to de-activate antenna elements by base station 105-*a* or by another network entity. For example, base station 105-*a* may determine that large array gain and reduced beam-width is of higher priority than reducing mutual coupling. Base station 105-*a* may transmit an indication that UE 115-*a* may not perform antenna element de-activation. In some cases, UE 115-*a* may determine that large array gain and reduced beam-width is of higher priority than reducing mutual coupling autonomously, or based on the indication from base station 105-*a*. In another example, base station 105-*a* may determine that reducing mutual coupling is of higher priority than large array gain and reduced beam-width. Base station 105-*a* may transmit an indication that UE 115-*a* may perform antenna element de-activation. In some cases, UE 115-*a* may determine that reducing mutual coupling is of higher priority than large array gain and reduced beam-width autonomously, or based on the indication from base station 105-*a*. For example, the determination that reducing mutual coupling is of higher priority may be based on mutual coupling reaching a threshold, such that the distortion of the positioning reference signal due to mutual coupling outweighs the impacts associated with reducing array gain and increasing beam-width. In some cases, UE 115-*a* may perform antenna element deactivation if UE 115-*a* receives an indication that UE 115-*a* is allowed to do so, otherwise, UE 115-*a* may not de-activate antenna elements. In some cases, UE 115-*a* may default to being able to de-activate antenna elements. As such, UE 115-*a* may de-activate antenna elements as needed unless UE 115-*a* receives an indication that UE 115-*a* is not allowed to do so.

In some implementations, if UE 115-*a* de-activates one or more antenna elements and UE 115-*a* is configured to receive a positioning reference signal, UE 115-*a* may request that base station 105-*a* increase the transmission power for transmitting the positioning reference signal and/or request that base station 105-*a* change one or more other transmission parameters (e.g., MCS, or precoding parameters) for transmitting the positioning reference signal. Base station 105-*a* may change one or more transmission parameters at base station 105-*a*, or one or more reception parameters at UE 115-*a* based on the request from UE 115-*a*, or based on capability information of UE 115-*a*, or a combination thereof. For example, base station 105-*a* may increase transmission power to transmit the positioning reference signal to UE 115-*a*. In some implementations, if UE 115-*a* de-activates one or more antenna elements and UE 115-*a* is configured to transmit a positioning reference signal, UE 115-*a* may request that UE 115-*a* be able to transmit the positioning reference signal and/or request that UE 115-*a* be able to change one or more other transmission parameters for transmitting the positioning reference signal. Base station 105-*a* may change one or more transmission parameters at UE 115-*a*, or one or more reception parameters at base station 105-*a* based on the request from UE 115-*a*, or based on capability information of UE 115-*a*, or a combination thereof. For example, base station 105-*a* may indicate to UE 115-*a* that UE 115-*a* may increase transmission power to transmit the positioning reference signal to base station 105-*a*.

If UE 115-*a* is configured to transmit the first positioning reference signal via the first radio frequency spectrum band, UE 115-*a* may transmit the reference signal 215 to base station 105-*a* via communications link 205-*b* (e.g., an uplink communications link). Base station 105-*a* may receive the reference signal 215 and measure a signal parameter (e.g., RSRP) associated with the reference signal 215 to determine the relative position of the UE 115-*a* via an uplink AoA procedure. If UE 115-*a* is configured to receive the first positioning reference signal via the first radio frequency spectrum band, UE 115-*a* may receive the reference signal 215 from base station 105-*a* via communications link 205-*b* (e.g., a downlink communications link). UE 115-*a* may receive the reference signal 215 as part of a downlink AoD procedure to determine the relative location of UE 115-*a*. In some cases, UE 115-*a* may measure a signal parameter (e.g., RSRP) associated with the reference signal 215, or receive an indication from a network entity (e.g., LMF) regarding beam related parameters associated with the reference signal 215. In some cases, UE 115-*a* may determine the relative position of UE 115-*a* based on the reference signal measurement, or based on the indicated beam related parameters, or both. In some cases, UE 115-*a* may transmit, to base station 105-*a*, an indication of the signal measurements, the beam-related parameters, or an indication of the relative location of UE 115-*a*, or a combination thereof. In some cases, base station 105-*a* may receive an indication from a network entity (e.g., LMF) regarding beam related parameters associated with the reference signal 215. Base station 105-*a* may determine the relative position of UE 115-*a* based on the indication of the signal measurements, the beam-related parameters from UE 115-*a*, the beam related parameters from the network entity, the indication of the relative location of UE 115-*a*, or a combination thereof.

Figure 3:
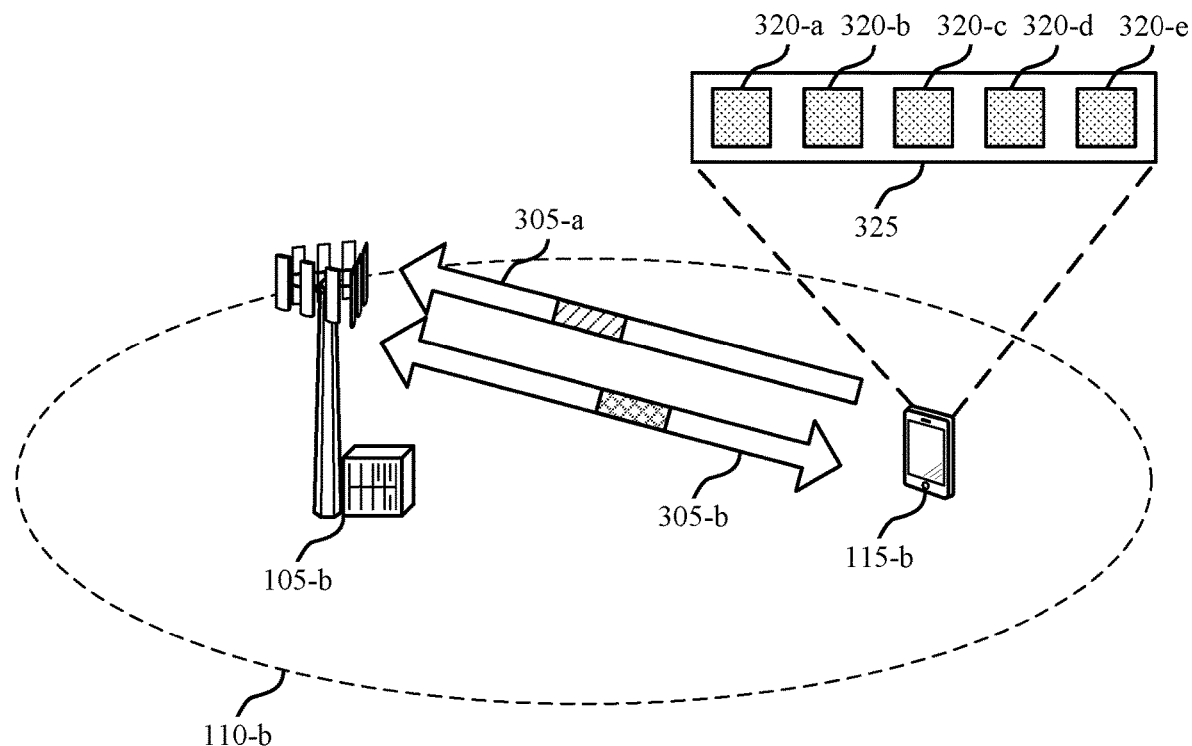

FIG. 3 illustrates an example of a wireless communications system 300 that supports techniques for improving angle-based positioning procedures in ultra-wide bandwidth systems in accordance with aspects of the present disclosure. The wireless communications system 300 may include base station 105-*b* and UE 115-*b*, which may be examples of a base station 105 and UEs 115 as described with reference to FIGS. 1 and 2. Base station 105-*b* may serve a geographic coverage area 110-*b*. In some cases, UE 115-*b* may implement a positioning ambiguity mitigation procedure. Additionally or alternatively, other wireless devices, such as base station 105-*b*, may implement a positioning ambiguity mitigation procedure.

UE 115-*b* and base station 105-*b* may be in communications with one another. For example, UE 115-*b* may transmit one or more signals to base station 105-*b* via communication link 305-*a*, which may be an uplink communications link. In some cases, UE 115-*b* may additionally transmit one or more signals to base station 105-*b* via communications link 305-*b*, which may be an uplink communications link. In some cases, base station 105-*b* may transmit signals to UE 115-*b* via communications link 305-*b*, which may be a downlink communications link. For example, UE 115-*b*, or base station 105-*b*, or both may transmit signals, such as reference signals 315 (e.g., positioning reference signals) to base station 105-*b*, or UE 115-*b*, respectively as part of a positioning procedure. The positioning procedure may serve to determine the position of UE 115-*b* relative to base station 105-*b*.

As described with reference to FIG. 2, a device, such as UE 115-*b* or base station 105-*b* may be configured with an antenna module 325 that UE 115-*b* may use across a wide frequency range (e.g., an ultra-wide bandwidth such as 24 to 48 GHz, 52.6 to 114.25 GHz, 52.6 to 71 GHz) to reduce the number of antenna modules 325 a device is configured with. For example, UE 115-*b* may be configured with at least antenna module 325 including five antenna elements 320, where the antenna module 325 is capable of communicating across a wide frequency range. However, because the antenna elements in the antenna module 325 are physically fixed and because the antenna module is configured to operate in a wide frequency range, inter-antenna element spacing of the antenna elements in the antenna module 325 will be equal to or near equal to $\lambda/2$ at some frequencies, greater than $\lambda/2$ at some other frequencies, and less than $\lambda/2$ at some other frequencies. When inter-antenna element spacing is less than $\lambda/2$, mutual coupling between the antenna elements may occur and when inter-element spacing is greater than $\lambda/2$, grating lobes may occur.

As described with reference to FIG. 2, UE 115-*b* may be configured to indicate the capabilities of UE 115-*b* by transmitting a capability message 310 to base station 105-*b* via communications link 305-*a*. The capability message 310 may indicate that UE 115-*b* is capable of communications across a range of radio frequency spectrum bands (e.g., an ultra-wide bandwidth), or that UE 115-*b* is configured with an antenna module 325 that is capable of communications across a range of radio frequency spectrum bands (e.g., an ultra-wide bandwidth), or a combination thereof. In some cases, UE 115-*a* may indicate in the capability message 310 the first set of frequencies, the second set of frequencies, or the third set of frequencies, or a combination thereof (as described with reference to FIG. 2). In some implementations, UE 115-*b* may be configured to include in the capability message 310 an indication of the inter-antenna element spacing, antenna element configuration, etc. of the antenna module 325 of UE 115-*b*.

In some cases, UE 115-*b* may transmit a request to base station 105-*b* that base station 105-*b* schedule one or more uplink and/or downlink positioning reference signals in the third set of frequencies, or request that the positioning reference signals not be scheduled in the first or second sets of frequencies so as to avoid mutual coupling and grating lobes.

Base station 105-*b* may receive the capability message 310 and the request. Base station 105-*b* may determine the frequencies at which UE 115-*b* may experience mutual coupling, grating lobes, or neither. In some implementations, base station 105-*b* may schedule positioning reference signals to be received by or transmitted by UE 115-*b* at frequencies that avoid mutual coupling and/or grating lobes. For example, base station 105-*b* may schedule UE 115-*b* to transmit or receive a first positioning reference signal in a first frequency range (e.g., a first radio frequency spectrum band), where the first radio frequency spectrum band is in the third set of frequencies in which mutual coupling and grating lobes may not occur. In some cases, base station 105-*b* may schedule UE 115-*b* to transmit or receive multiple positioning reference signals at multiple frequency spectrums bands, where each of the multiple frequency spectrums bands are included in the third set of frequencies, or otherwise avoid mutual coupling, grating lobes, or both.

For example, UE 115-*b* may be configured to transmit the first positioning reference signal via the first radio frequency spectrum band. As such, UE 115-*a* may transmit the reference signal 315 to base station 105-*b* via communications link 305-*b* (e.g., an uplink communications link) using active antenna elements 320-*a*, 320-*b*, 320-*c*, 320-*d*, and 320-*e* of antenna module 325. Base station 105-*b* may receive the reference signal 315 and measure a signal parameter (e.g., RSRP) associated with the reference signal 315 to determine the relative position of the UE 115-*b* via an uplink AoA procedure. In another example, UE 115-*b* may be configured to receive the first positioning reference signal via the first radio frequency spectrum band. As such, UE 115-*a* may receive the reference signal 315 from base station 105-*b* via communications link 305-*b* (e.g., a downlink communications link) using active antenna elements 320-*a*, 320-*b*, 320-*c*, 320-*d*, and 320-*e* of antenna module 325. UE 115-*b* may receive the reference signal 315 as part of a downlink AoD procedure to determine the relative location of UE 115-*b*. In some cases, UE 115-*b* may measure a signal parameter (e.g., RSRP) associated with the reference signal 315, or receive an indication from a network entity (e.g., LMF) regarding beam related parameters associated with the reference signal 315. In some cases, UE 115-*b* may determine the relative position of UE 115-*b* based on the reference signal measurement, or based on the indicated beam related parameters, or both. In some cases, UE 115-*b* may transmit, to base station 105-*b*, an indication of the signal measurements, the beam-related parameters, or an indication of the relative location of UE 115-*b*, or a combination thereof.

In some cases, UE 115-*b* may be configured to receive multiple positioning reference signals, where some of the positioning reference signals are scheduled in the first set of frequencies (e.g., associated with mutual coupling) or the second set of frequencies (e.g., associated with grating lobes). The information (e.g., signal strength, beam parameters) gained from the multiple positioning reference signals may be used to resolve positioning ambiguities. As such, additionally to the first positioning reference signal, base station 105-*b* may schedule UE 115-*b* to transmit or receive one or more other positioning reference signals at frequencies not included in the third set of frequencies, such as at frequencies included in the first set of frequencies or the second set of frequencies. For example, UE 115-*b* may receive an indication that UE 115-*b* is scheduled to receive or transmit a second positioning reference signal at a second radio frequency spectrum band that is in the second set of frequencies, and as such, grating lobes may occur. In such cases, UE 115-*a* may be configured to transmit or receive both the first and the second positioning reference signals which UE 115-*b* and/or base station 105-*b* may use to resolve positioning ambiguities caused by the second positioning reference signal.

In some implementations, UE 115-*b* and/or base station 105-*b* may be configured to perform multiple positioning determination procedures. For example, in addition to determining uplink AoA, uplink AoD, downlink AoA, or downlink AoD, or a combination thereof to determine the relative position of UE 115-*b*, base station 105-*b* and/or UE 115-*b* may be configured to perform non-angle based positioning procedures, such as time delay measurements, signal strength measurements, etc. As such, the non-angle based methods may be used in conjunction with the angle-based methods to resolve positioning ambiguities that may result do to grating lobes, mutual coupling, or both.

The positioning ambiguity mitigation techniques as described with reference to FIGS. 2 and 3 may be implemented by a base station 105 in downlink AoD or ZoD procedures or uplink AoA or ZoA procedures, or may be implemented by a UE in downlink AoA or ZoA procedures or uplink AoD or ZoD procedures, or may be implemented by some other device (e.g., relay node, CPE, IAB node, TRP). Further, the techniques described herein may not be limited to resolving positioning ambiguities. Mutual coupling and grating lobes depend on the frequency of the signal being transmitted and the inter-antenna element spacing of the transmitting and/or receiving device and may occur regardless of the signal being a positioning reference signal. As such, a UE 115 or base station 105 may implement the techniques described herein to mitigate mutual coupling and/grating lobes for any signal type or communications procedure (e.g., positioning procedure, scheduling procedure, data transmission procedure).

Figure 4:
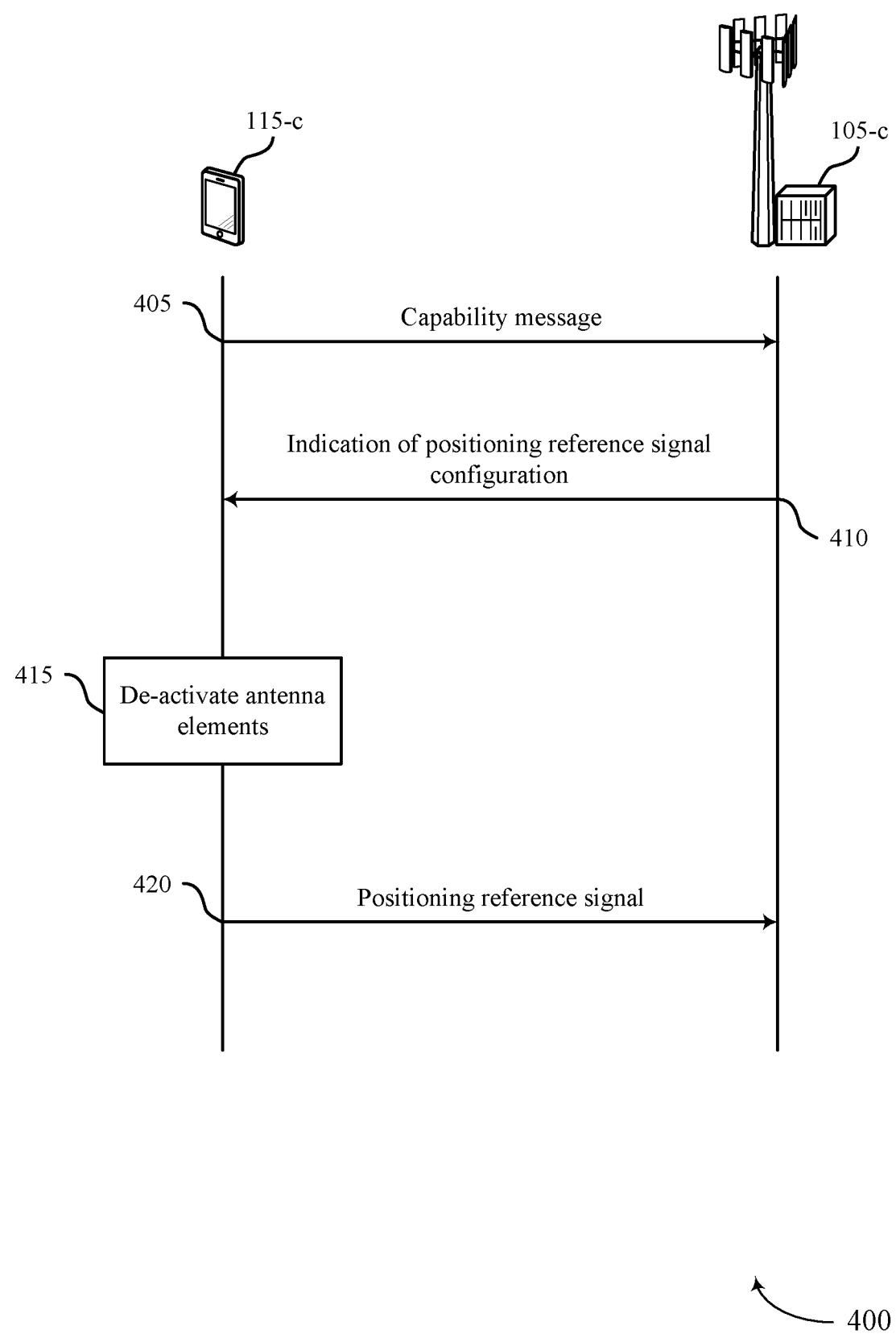
FIGS. 4 through 6 illustrate examples of process flows that support techniques for improving angle-based positioning procedures in ultra-wide bandwidth systems in accordance with aspects of the present disclosure.

FIG. 4 illustrates an example of a process flow 400 that supports techniques for improving angle-based positioning procedures in ultra-wide bandwidth systems in accordance with aspects of the present disclosure. The process flow 400 may illustrate an example positioning ambiguity mitigation scheme to determine a relative position of a UE 115. For example, UE 115-*c* may perform the positioning ambiguity mitigation procedure and transmit reference signals to base station 105-*c*. Base station 105-*c* and UE 115-*c* may be examples of the corresponding wireless devices described with reference to FIGS. 1 through 3. In some cases, instead of UE 115-*c* implementing the positioning ambiguity mitigation procedure, a different type of wireless device (e.g., a base station 105) may perform the procedure. Alternative examples of the following may be implemented, where some steps are performed in a different order than described or are not performed at all. In some cases, steps may include additional features not mentioned below, or further steps may be added.

At 405, UE 115-*c* may transmit, to base station 105-*c*, a capability message indicating that UE 115-*c* is capable of communications across a range of radio frequency spectrum bands. An inter-antenna element spacing of an antenna module of UE 115-*c* may be less than half of a wavelength (e.g., less than $\lambda/2$) of at least a subset of radio frequency spectrum bands of the range of radio frequency spectrum bands.

In some cases, UE 115-*c* may transmit a request for UE 115-*c* to increase transmission power of the positioning reference signal based on de-activating the one or more antenna elements. In some cases, UE 115-*c* may transmit a request for base station 105-*c* to transmit positioning reference signals to UE 115-*c* using a set of radio frequency spectrum bands that is different than the subset of radio frequency spectrum bands, so as to avoid mutual coupling. In some cases, UE 115-*c* may transmit an indication that mutual coupling will occur at UE 115-*c* in the subset of radio frequency spectrum bands of the range of radio frequency spectrum bands based on the inter-antenna element spacing of the antenna module of UE 115-*c* being less than half of the wavelength in at least the subset of radio frequency spectrum bands. UE 115-*c* may transmit an indication that UE 115-*c* is capable of communications across the range of radio frequency spectrum bands via a single antenna module of UE 115-*c*. UE 115-*c* may transmit an indication that UE 115-*c* is capable of de-activating antenna elements of the antenna module of UE 115-*c*.

At 410, UE 115-*c* may receive, from base station 105-*c*, control signaling indicating that UE 115-*c* is configured to transmit a positioning reference signal to base station 105-*c* on a first radio frequency spectrum band of the subset of radio frequency spectrum bands (e.g., on a frequency that may result in mutual coupling).

In some cases, UE 115-*c* may identify that the inter-antenna element spacing of the antenna module of UE 115-*c* is less than half the wavelength of the first radio frequency spectrum band, and UE 115-*c* may determine increase the inter-antenna element spacing between the active antenna elements of the antenna module of UE 115-*c* by de-activating the one or more antenna elements based on the inter-antenna element spacing of the antenna module of UE 115-*c* being less than half the wavelength of the first radio frequency spectrum band.

At 415, UE 115-*c* may de-activate one or more antenna elements of the antenna module based on a wavelength of the first radio frequency spectrum band and the inter-antenna element spacing (e.g., the inter-antenna element spacing is less than half the wavelength associated with the first radio frequency spectrum band).

At 420, UE 115-*c* may transmit, to base station 105-*c*, the positioning reference signal via one or more active antenna elements of the antenna module.

Figure 5:
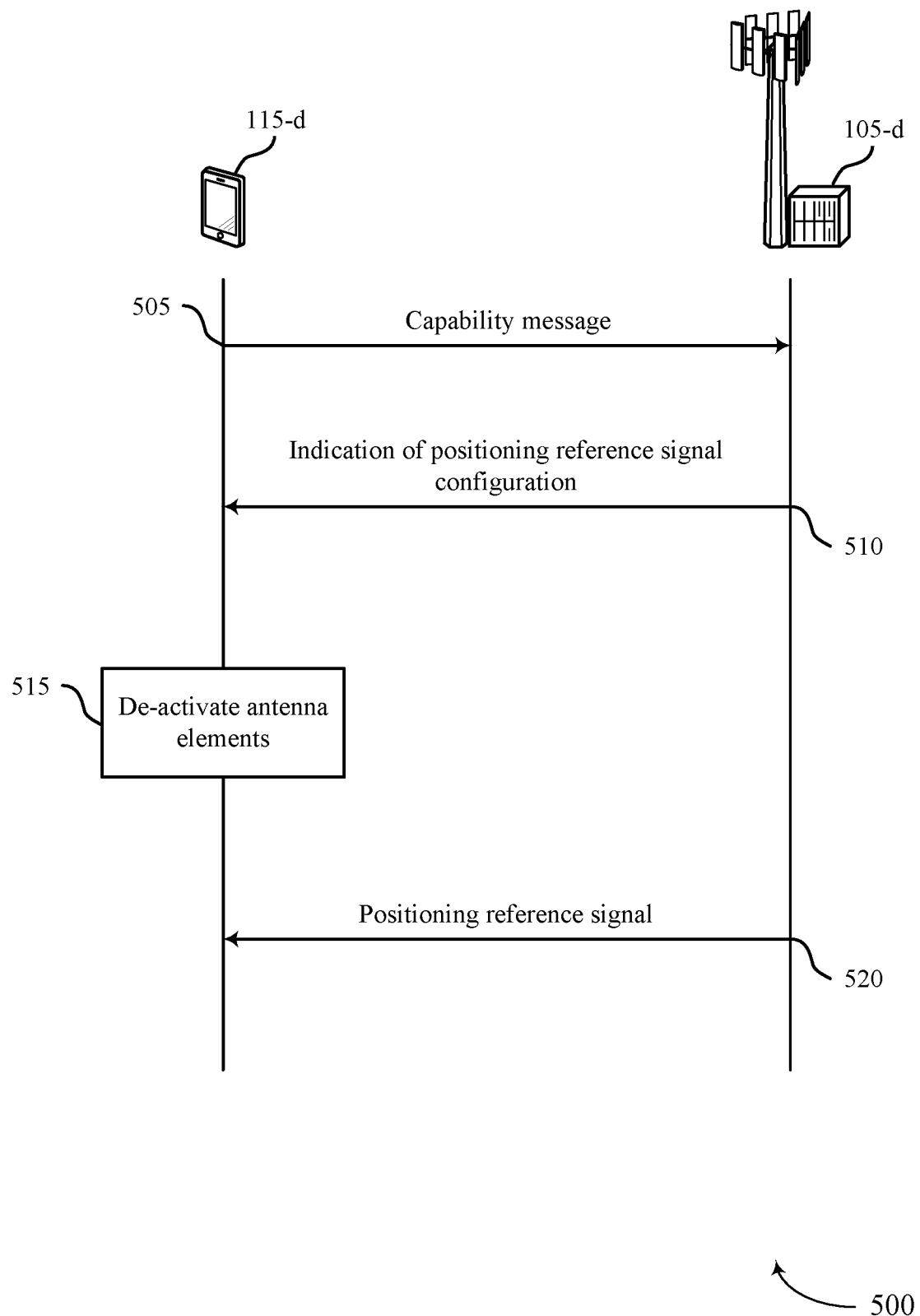

FIG. 5 illustrates an example of a process flow 500 that supports techniques for improving angle-based positioning procedures in ultra-wide bandwidth systems in accordance with aspects of the present disclosure. The process flow 500 may illustrate an example positioning ambiguity mitigation scheme to determine a relative position of a UE 115. For example, UE 115-*d* may perform the positioning ambiguity mitigation procedure and receive reference signals from base station 105-*d*. Base station 105-*d* and UE 115-*d* may be examples of the corresponding wireless devices described with reference to FIGS. 1 through 4. In some cases, instead of UE 115-*d* implementing the positioning ambiguity mitigation procedure, a different type of wireless device (e.g., a base station 105) may perform the procedure. Alternative examples of the following may be implemented, where some steps are performed in a different order than described or are not performed at all. In some cases, steps may include additional features not mentioned below, or further steps may be added.

At 505, UE 115-*d* may transmit, to base station 105-*d*, a capability message indicating that UE 115-*d* is capable of communications across a range of radio frequency spectrum bands. An inter-antenna element spacing of an antenna module of UE 115-*d* is less than half of a wavelength (e.g., less than $\lambda/2$) of at least a subset of radio frequency spectrum bands of the range of radio frequency spectrum bands.

In some implementations, UE 115-*d* may transmit a request for base station 105-*d* to increase transmission power of the positioning reference signal based on de-activating the one or more antenna elements. In some cases, UE 115-*d* may transmit a request for base station 105-*d* to transmit positioning reference signals to UE 115-*d* using a set of radio frequency spectrum bands that is different than the subset of radio frequency spectrum bands. UE 115-*d* may transmit an indication that mutual coupling will occur at UE 115-*d* in the subset of radio frequency spectrum bands of the range of radio frequency spectrum bands based on the inter-antenna element spacing of the antenna module of UE 115-*d* being less than half of the wavelength in at least the subset of radio frequency spectrum bands. UE 115-*d* may transmit an indication that UE 115-*d* is capable of communications across the range of radio frequency spectrum bands via a single antenna module of UE 115-*d*. UE 115-*d* may transmit an indication that UE 115-*d* is capable of de-activating antenna elements of the antenna module of the UE.

At 510, UE 115-*d* may receive, from base station 105-*d*, control signaling indicating that UE 115-*c* is configured to receive a positioning reference signal from base station 105-*d* on a first radio frequency spectrum band of the subset of radio frequency spectrum bands (e.g., on a frequency that may result in mutual coupling).

In some cases, UE 115-*d* may identify that the inter-antenna element spacing of the antenna module of UE 115-*d* is less than half the wavelength of the first radio frequency spectrum band, and determine to increase the inter-antenna element spacing between the active antenna elements of the antenna module of UE 115-*d* by de-activating the one or more antenna elements based on the inter-antenna element spacing of the antenna module of UE 115-*d* being less than half the wavelength of the first radio frequency spectrum band.

At 515, UE 115-*d* may de-activate one or more antenna elements of the antenna module based on a wavelength of the first radio frequency spectrum band and the inter-antenna element spacing (e.g., the inter-antenna element spacing is less than half the wavelength associated with the first radio frequency spectrum band).

At 520, UE 115-*d* may receive, from base station 105-*d*, the positioning reference signal via one or more active antenna elements of the antenna module.

In some cases, UE 115-*d* may measure a signal strength of the positioning reference signal received via the one or more active antenna elements of the antenna module, and transmit (e.g., to base station 105-*e*, or to the LMF) the signal strength of the positioning reference signal for downlink AoD estimation. In some cases, UE 115-*d* may receive, from an LMF, communications information associated with the positioning reference signal received by UE 115-*d*. The communications information may include a beam shape, a beam pattern, a peak or boresight direction of array gain, or an array gain pattern as a function of angles, or a combination thereof.

Figure 6:
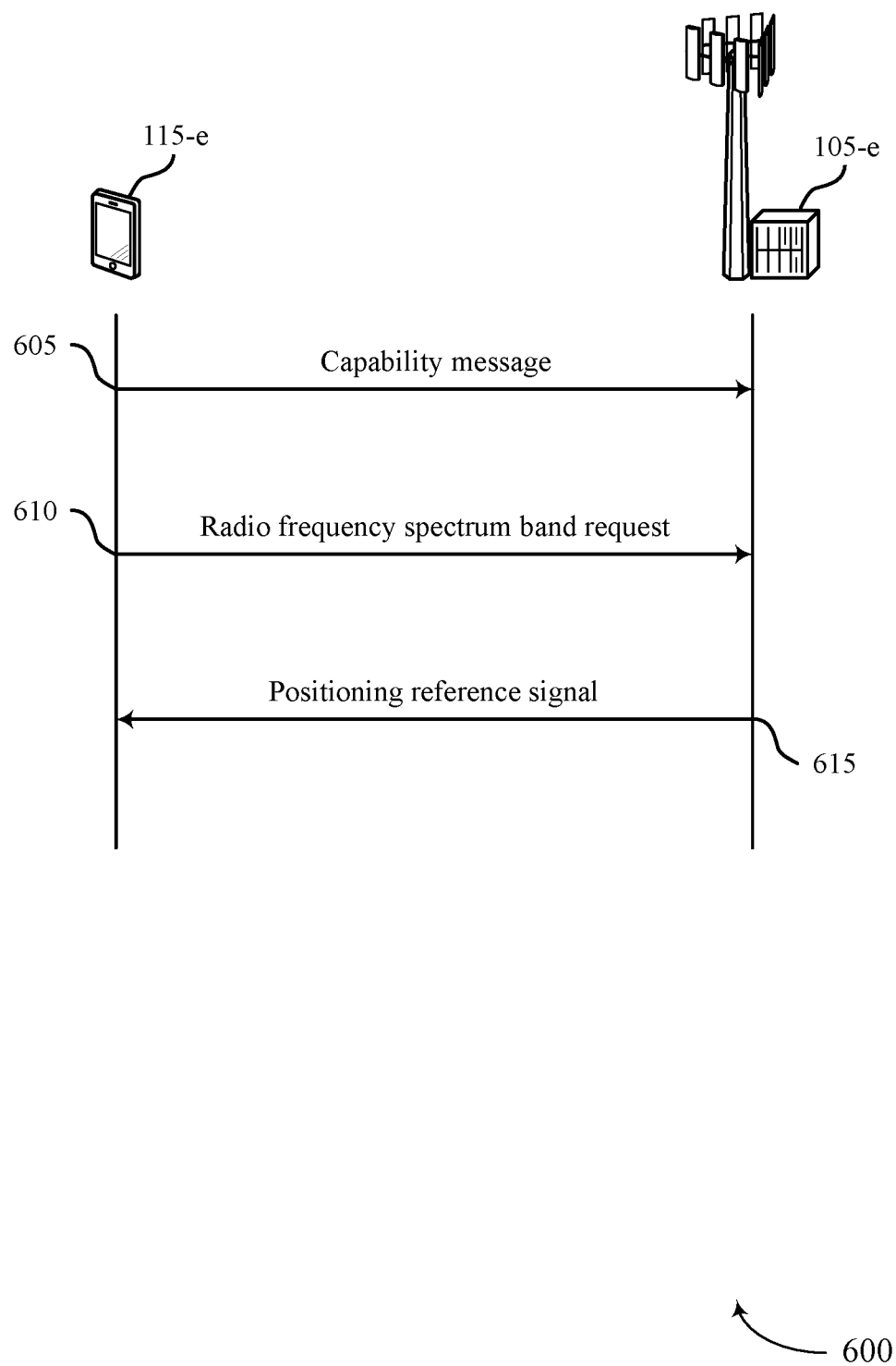

FIG. 6 illustrates an example of a process flow 600 that supports techniques for improving angle-based positioning procedures in ultra-wide bandwidth systems in accordance with aspects of the present disclosure. The process flow 600 may illustrate an example positioning ambiguity mitigation scheme to determine a relative position of a UE 115. For example, UE 115-*e* may perform the positioning ambiguity mitigation procedure and receive reference signals from base station 105-*e*. Base station 105-*e* and UE 115-*e* may be examples of the corresponding wireless devices described with reference to FIGS. 1 through 5. In some cases, instead of UE 115-*e* implementing the positioning ambiguity mitigation procedure, a different type of wireless device (e.g., a base station 105) may perform the procedure. Alternative examples of the following may be implemented, where some steps are performed in a different order than described or are not performed at all. In some cases, steps may include additional features not mentioned below, or further steps may be added.

At 605, UE 115-*e* may transmit, to base station 105-*e*, a capability message indicating that UE 115-*e* is capable of communications across a range of radio frequency spectrum bands. The inter-antenna element spacing of an antenna module of UE 115-*e* is greater than half of a wavelength (e.g., greater than $\lambda/2$) of at least a subset of radio frequency spectrum bands of the range of radio frequency spectrum bands. In some cases, UE 115-*e* may transmit an indication that beam weights used at UE 115-*e* may result in grating lobes in the subset of radio frequency spectrum bands of the range of radio frequency spectrum bands based on the inter-antenna element spacing of the antenna module of UE 115-*e* being greater than half of the wavelength in at least the subset of radio frequency spectrum bands. In some cases, UE 115-*e* may transmit, to base station 105-*e*, an indication that mutual coupling may occur at UE 115-*e* in a second subset of radio frequency spectrum bands of the range of radio frequency spectrum bands based on the inter-antenna element spacing of the antenna module of UE 115-*e* being less than half of the wavelength in at least the second subset of radio frequency spectrum bands. In some cases, UE 115-*e* may transmit an indication that UE 115-*d* is capable of communications across the range of radio frequency spectrum bands via a single antenna module of UE 115-*e*.

At 610, UE 115-*e* may transmit, to base station 105-*e*, a request for base station 105-*e* to transmit positioning reference signals to UE 115-*e* using a set of radio frequency spectrum bands that is different than the subset of radio frequency spectrum bands, so as to avoid grating lobes.

At 615, UE 115-*e* may receive, from base station 105-*e*, a first positioning reference signal via a first radio frequency spectrum band based on the request, where the first radio frequency spectrum band is included in the set of radio frequency spectrum bands that avoids grating lobes. UE 115-*e* may receive, from base station 105-*e*, the first positioning reference signal via the first radio frequency spectrum band based on the indication that mutual coupling will occur at the UE in the second subset of radio frequency spectrum bands, the first radio frequency spectrum band included in the set of radio frequency spectrum bands different from the second subset of radio frequency spectrum bands.

UE 115-*e* may measure a signal strength of the first positioning reference signal received via the first radio frequency spectrum band, and transmit (e.g., to base station 105-*e*, or to the LMF) the signal strength of the first positioning reference signal for downlink AoD estimation.

In some cases, UE 115-*e* may receive, from base station 105-*e*, a second positioning reference signal via a second radio frequency spectrum band, where the second radio frequency spectrum band is included in the subset of radio frequency spectrum bands (e.g., in the subset of frequencies in which grating lobes may occur). UE 115-*e* may measure a signal strength of the first positioning reference signal received via the first radio frequency spectrum band and a signal strength of the second positioning reference signal received via the second radio frequency spectrum band, and UE 115-*e* may transmit (e.g., to base station 105-*e*, or to an LMF) the signal strength of the first positioning reference signal and the signal strength of the second positioning reference signal for downlink angle of departure estimation.

In some implementations, UE 115-*e* may measure a signal strength of the first positioning reference signal received via the first radio frequency spectrum band or a signal strength of the second positioning reference signal received via the second radio frequency spectrum band, or both, and may measure a TDoA (or some other non-angle based positioning parameter) of the first positioning reference signal, a TDoA (or some other non-angle based positioning parameter) of the second positioning reference signal, or both, UE 115-*e* may transmit an indication of a position of UE 115-*d* relative to base station 105-*e* based on the signal strength of the first positioning reference signal, the signal strength of the second positioning reference signal, the TDoA of the first positioning reference signal, the TDoA of the second positioning reference signal, or a combination thereof.

In some cases, UE 115-*e* may receive, from an LMF, communications information associated with the first positioning reference signal, or the second positioning reference signal, or both, the communications information including a beam shape, a beam pattern, a peak or boresight direction of array gain, or an array gain pattern as a function of spatial angles, or a combination thereof.

Figure 7:
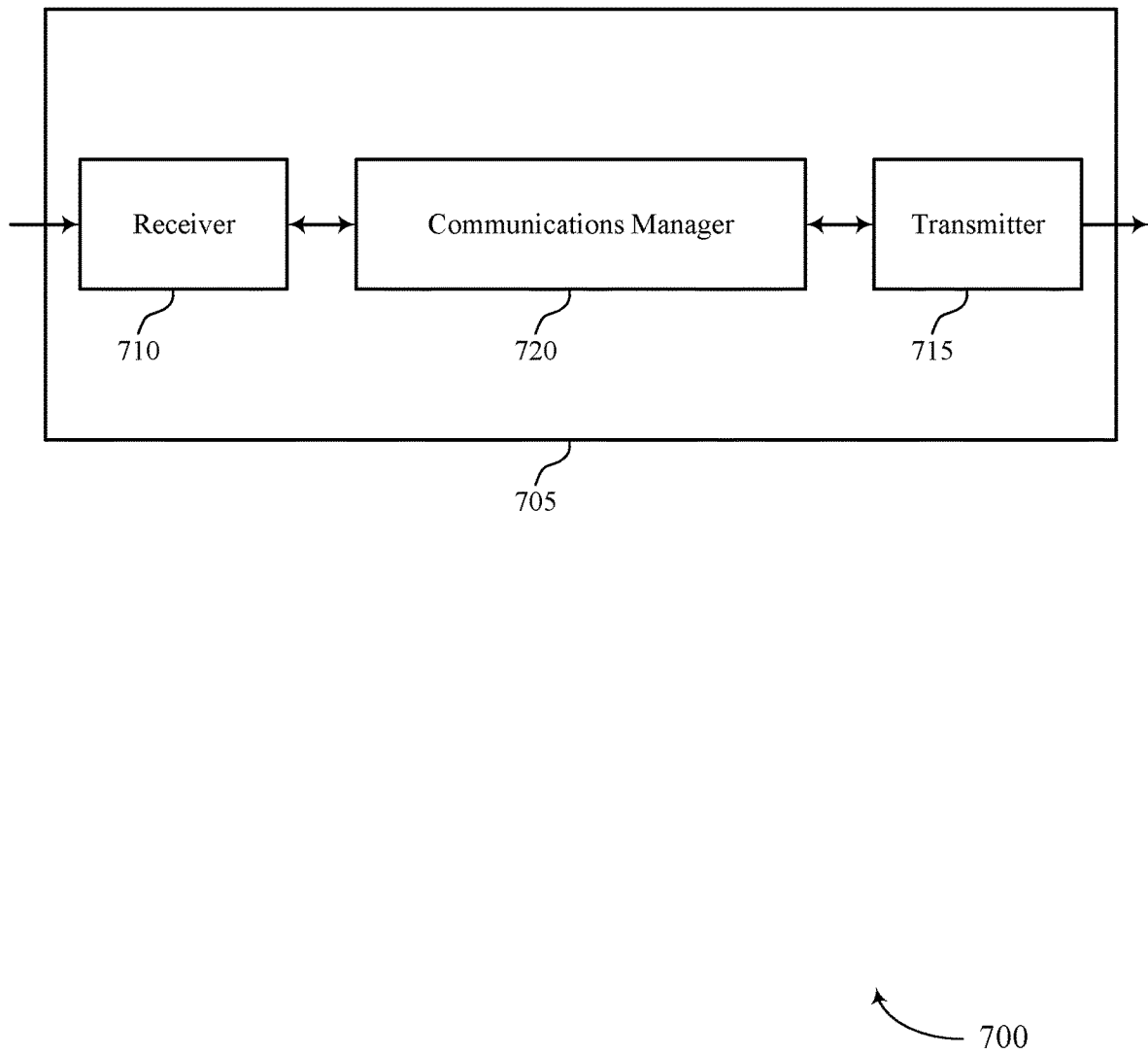
FIGS. 7 and 8 show block diagrams of devices that support techniques for improving angle-based positioning procedures in ultra-wide bandwidth systems in accordance with aspects of the present disclosure.

FIG. 7 shows a block diagram 700 of a device 705 that supports techniques for improving angle-based positioning procedures in ultra-wide bandwidth systems in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for improving angle-based positioning procedures in ultra-wide bandwidth systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for improving angle-based positioning procedures in ultra-wide bandwidth systems). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for improving angle-based positioning procedures in ultra-wide bandwidth systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The communications manager 720 may be configured as or otherwise support a means for receiving control signaling indicating that the UE is configured to transmit a positioning reference signal to the base station on a first radio frequency spectrum band of the subset of radio frequency spectrum bands. The communications manager 720 may be configured as or otherwise support a means for de-activating one or more antenna elements of the antenna module based on a wavelength of the first radio frequency spectrum band and the inter-antenna element spacing. The communications manager 720 may be configured as or otherwise support a means for transmitting the positioning reference signal via one or more active antenna elements of the antenna module.

Additionally or alternatively, the communications manager 720 may support wireless communications at a UE in accordance with examples as disclosed herein. For example, the communications manager 720 may be configured as or otherwise support a means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The communications manager 720 may be configured as or otherwise support a means for receiving control signaling indicating that the UE is configured to receive a positioning reference signal from the base station on a first radio frequency spectrum band of the subset of radio frequency spectrum bands. The communications manager 720 may be configured as or otherwise support a means for de-activating one or more antenna elements of the antenna module based on a wavelength of the first radio frequency spectrum band and the inter-antenna element spacing. The communications manager 720 may be configured as or otherwise support a means for receiving the positioning reference signal via one or more active antenna elements of the antenna module.

Additionally or alternatively, the communications manager 720 may support wireless communications at a UE in accordance with examples as disclosed herein. For example, the communications manager 720 may be configured as or otherwise support a means for transmitting, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The communications manager 720 may be configured as or otherwise support a means for transmitting, to the base station, a request for the base station to transmit positioning reference signals to the UE using a set of radio frequency spectrum bands that is different than the subset of radio frequency spectrum bands. The communications manager 720 may be configured as or otherwise support a means for receiving, from the base station, a first positioning reference signal via a first radio frequency spectrum band based on the request, where the first radio frequency spectrum band is included in the set of radio frequency spectrum bands.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources.

Figure 8:
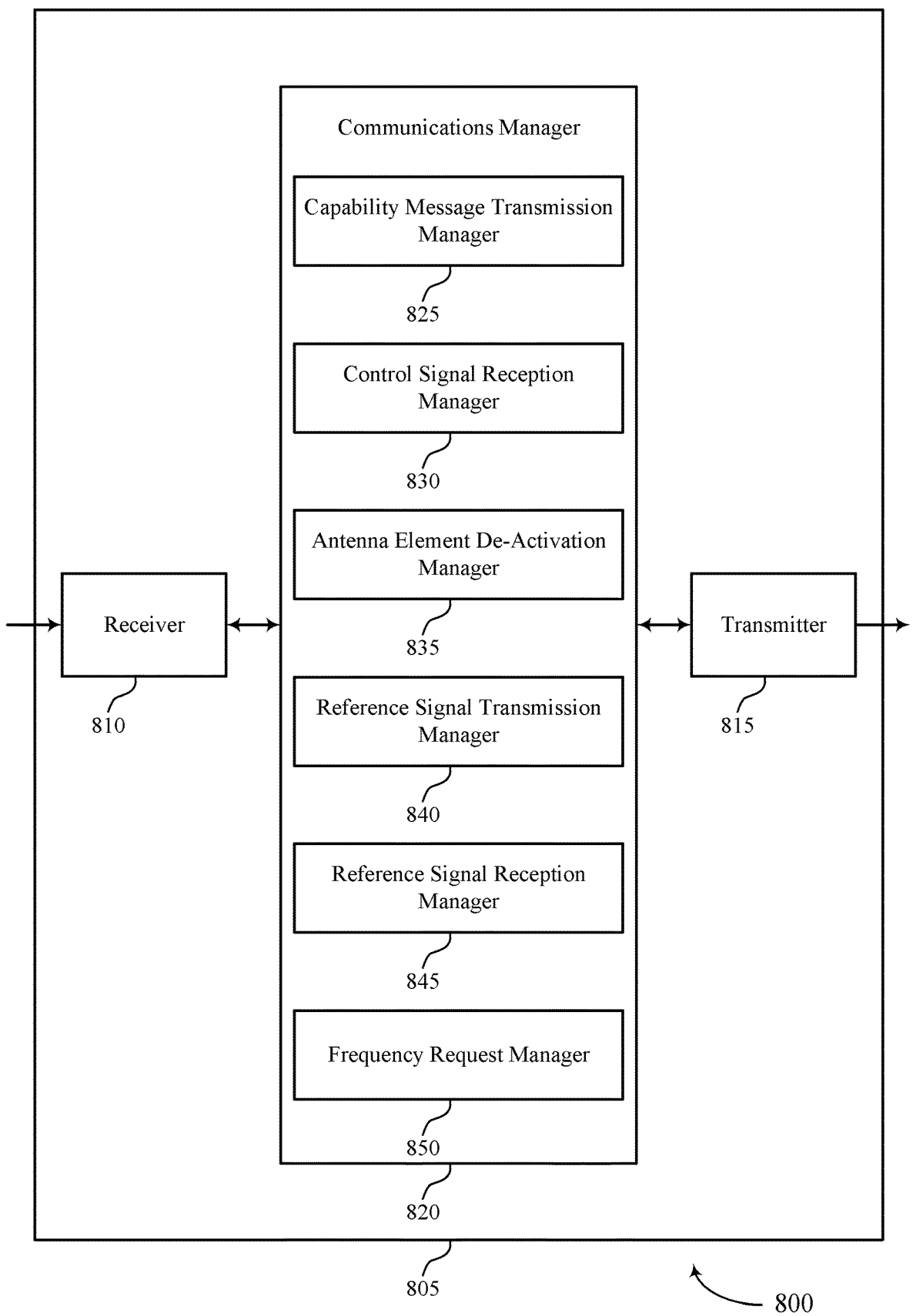

FIG. 8 shows a block diagram 800 of a device 805 that supports techniques for improving angle-based positioning procedures in ultra-wide bandwidth systems in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for improving angle-based positioning procedures in ultra-wide bandwidth systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for improving angle-based positioning procedures in ultra-wide bandwidth systems). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for improving angle-based positioning procedures in ultra-wide bandwidth systems as described herein. For example, the communications manager 820 may include a capability message transmission manager 825, a control signal reception manager 830, an antenna element de-activation manager 835, a reference signal transmission manager 840, a reference signal reception manager 845, a frequency request manager 850, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The capability message transmission manager 825 may be configured as or otherwise support a means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The control signal reception manager 830 may be configured as or otherwise support a means for receiving control signaling indicating that the UE is configured to transmit a positioning reference signal to the base station on a first radio frequency spectrum band of the subset of radio frequency spectrum bands. The antenna element de-activation manager 835 may be configured as or otherwise support a means for de-activating one or more antenna elements of the antenna module based on a wavelength of the first radio frequency spectrum band and the inter-antenna element spacing. The reference signal transmission manager 840 may be configured as or otherwise support a means for transmitting the positioning reference signal via one or more active antenna elements of the antenna module.

Additionally or alternatively, the communications manager 820 may support wireless communications at a UE in accordance with examples as disclosed herein. The capability message transmission manager 825 may be configured as or otherwise support a means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The control signal reception manager 830 may be configured as or otherwise support a means for receiving control signaling indicating that the UE is configured to receive a positioning reference signal from the base station on a first radio frequency spectrum band of the subset of radio frequency spectrum bands. The antenna element de-activation manager 835 may be configured as or otherwise support a means for de-activating one or more antenna elements of the antenna module based on a wavelength of the first radio frequency spectrum band and the inter-antenna element spacing. The reference signal reception manager 845 may be configured as or otherwise support a means for receiving the positioning reference signal via one or more active antenna elements of the antenna module.

Additionally or alternatively, the communications manager 820 may support wireless communications at a UE in accordance with examples as disclosed herein. The capability message transmission manager 825 may be configured as or otherwise support a means for transmitting, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The frequency request manager 850 may be configured as or otherwise support a means for transmitting, to the base station, a request for the base station to transmit positioning reference signals to the UE using a set of radio frequency spectrum bands that is different than the subset of radio frequency spectrum bands. The reference signal reception manager 845 may be configured as or otherwise support a means for receiving, from the base station, a first positioning reference signal via a first radio frequency spectrum band based on the request, where the first radio frequency spectrum band is included in the set of radio frequency spectrum bands.

Figure 9:
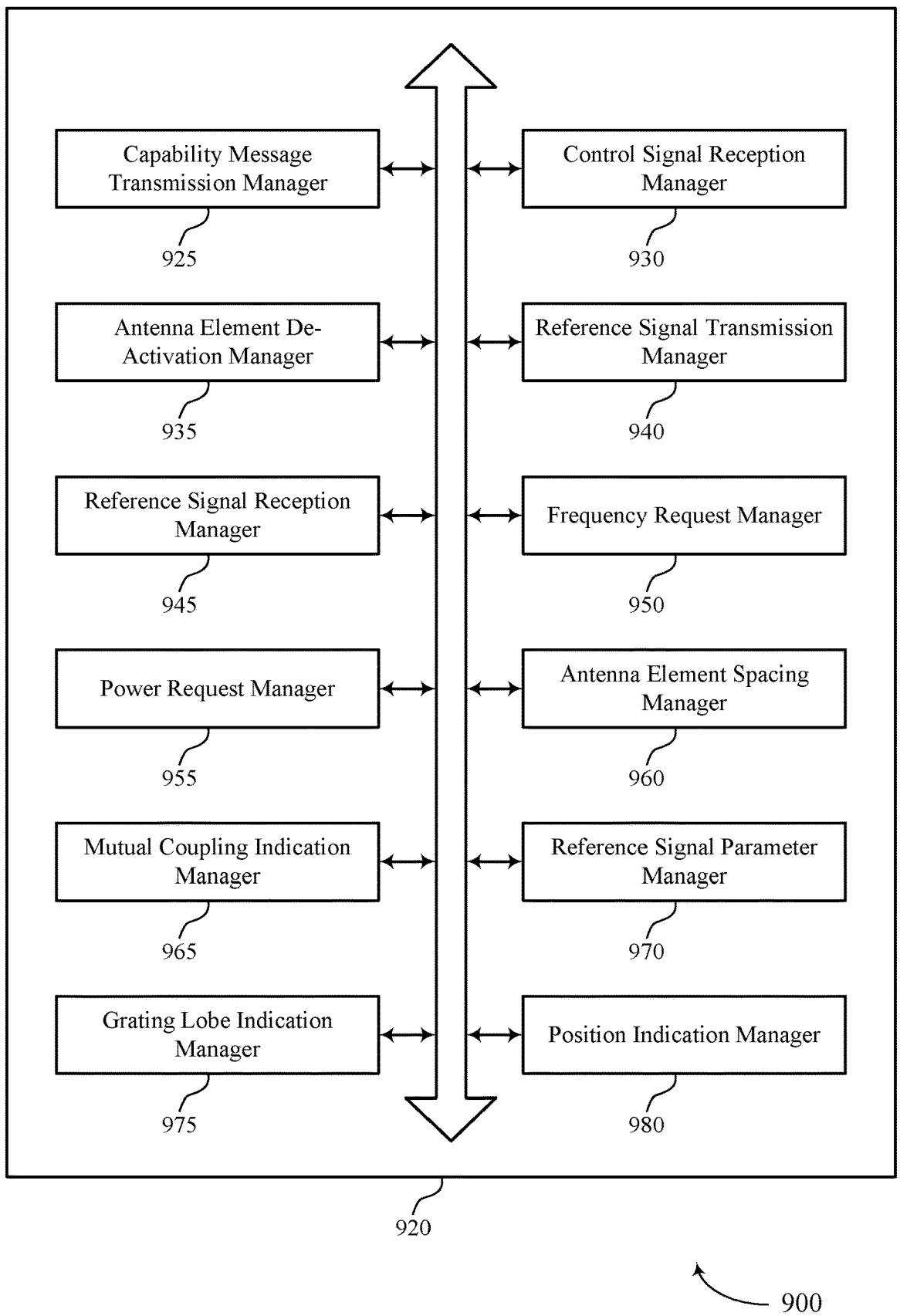
FIG. 9 shows a block diagram of a communications manager that supports techniques for improving angle-based positioning procedures in ultra-wide bandwidth systems in accordance with aspects of the present disclosure.

FIG. 9 shows a block diagram 900 of a communications manager 920 that supports techniques for improving angle-based positioning procedures in ultra-wide bandwidth systems in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for improving angle-based positioning procedures in ultra-wide bandwidth systems as described herein. For example, the communications manager 920 may include a capability message transmission manager 925, a control signal reception manager 930, an antenna element de-activation manager 935, a reference signal transmission manager 940, a reference signal reception manager 945, a frequency request manager 950, a power request manager 955, an antenna element spacing manager 960, a mutual coupling indication manager 965, a reference signal parameter manager 970, a grating lobe indication manager 975, a position indication manager 980, or any combination thereof. Each of these components may communicate, directly or indirectly, with one another (e.g., via one or more buses).

The communications manager 920 may support wireless communications at a UE in accordance with examples as disclosed herein. The capability message transmission manager 925 may be configured as or otherwise support a means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The control signal reception manager 930 may be configured as or otherwise support a means for receiving control signaling indicating that the UE is configured to transmit a positioning reference signal to the base station on a first radio frequency spectrum band of the subset of radio frequency spectrum bands. The antenna element de-activation manager 935 may be configured as or otherwise support a means for de-activating one or more antenna elements of the antenna module based on a wavelength of the first radio frequency spectrum band and the inter-antenna element spacing. The reference signal transmission manager 940 may be configured as or otherwise support a means for transmitting the positioning reference signal via one or more active antenna elements of the antenna module.

In some examples, the power request manager 955 may be configured as or otherwise support a means for transmitting a request for the UE to increase transmission power of the positioning reference signal based on de-activating the one or more antenna elements.

In some examples, the frequency request manager 950 may be configured as or otherwise support a means for transmitting a request for the base station to transmit positioning reference signals to the UE using a set of radio frequency spectrum bands that is different than the subset of radio frequency spectrum bands.

In some examples, the antenna element spacing manager 960 may be configured as or otherwise support a means for identifying that the inter-antenna element spacing of the antenna module of the UE is less than half the wavelength of the first radio frequency spectrum band. In some examples, the antenna element spacing manager 960 may be configured as or otherwise support a means for determining to increase the inter-antenna element spacing between active antenna elements of the antenna module of the UE by de-activating the one or more antenna elements based on the inter-antenna element spacing of the antenna module of the UE being less than half the wavelength of the first radio frequency spectrum band.

In some examples, to support transmitting the capability message, the mutual coupling indication manager 965 may be configured as or otherwise support a means for transmitting an indication that mutual coupling will occur at the UE in the subset of radio frequency spectrum bands of the range of radio frequency spectrum bands based on the inter-antenna element spacing of the antenna module of the UE being less than half of the wavelength in at least the subset of radio frequency spectrum bands.

In some examples, to support transmitting the capability message, the capability message transmission manager 925 may be configured as or otherwise support a means for transmitting an indication that the UE is capable of communications across the range of radio frequency spectrum bands via a single antenna module of the UE.

In some examples, to support transmitting the capability message, the capability message transmission manager 925 may be configured as or otherwise support a means for transmitting an indication that the UE is capable of de-activating antenna elements of the antenna module of the UE.

Additionally or alternatively, the communications manager 920 may support wireless communications at a UE in accordance with examples as disclosed herein. In some examples, the capability message transmission manager 925 may be configured as or otherwise support a means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. In some examples, the control signal reception manager 930 may be configured as or otherwise support a means for receiving control signaling indicating that the UE is configured to receive a positioning reference signal from the base station on a first radio frequency spectrum band of the subset of radio frequency spectrum bands. In some examples, the antenna element de-activation manager 935 may be configured as or otherwise support a means for de-activating one or more antenna elements of the antenna module based on a wavelength of the first radio frequency spectrum band and the inter-antenna element spacing. The reference signal reception manager 945 may be configured as or otherwise support a means for receiving the positioning reference signal via one or more active antenna elements of the antenna module.

In some examples, the power request manager 955 may be configured as or otherwise support a means for transmitting a request for the base station to increase transmission power of the positioning reference signal based on de-activating the one or more antenna elements.

In some examples, the frequency request manager 950 may be configured as or otherwise support a means for transmitting a request for the base station to transmit positioning reference signals to the UE using a set of radio frequency spectrum bands that is different than the subset of radio frequency spectrum bands.

In some examples, the antenna element spacing manager 960 may be configured as or otherwise support a means for identifying that the inter-antenna element spacing of the antenna module of the UE is less than half the wavelength of the first radio frequency spectrum band. In some examples, the antenna element spacing manager 960 may be configured as or otherwise support a means for determining to increase the inter-antenna element spacing between active antenna elements of the antenna module of the UE by de-activating the one or more antenna elements based on the inter-antenna element spacing of the antenna module of the UE being less than half the wavelength of the first radio frequency spectrum band.

In some examples, the reference signal parameter manager 970 may be configured as or otherwise support a means for measuring a signal strength of the positioning reference signal received via the one or more active antenna elements of the antenna module. In some examples, the reference signal parameter manager 970 may be configured as or otherwise support a means for transmitting the signal strength of the positioning reference signal for downlink angle of departure estimation.

In some examples, the reference signal parameter manager 970 may be configured as or otherwise support a means for receiving, from a location management function, communications information associated with the positioning reference signal received by the UE, the communications information including a beam shape, a beam pattern, a peak or boresight direction of array gain, or an array gain pattern as a function of angles, or a combination thereof.

In some examples, to support transmitting the capability message, the mutual coupling indication manager 965 may be configured as or otherwise support a means for transmitting an indication that mutual coupling will occur at the UE in the subset of radio frequency spectrum bands of the range of radio frequency spectrum bands based on the inter-antenna element spacing of the antenna module of the UE being less than half of the wavelength in at least the subset of radio frequency spectrum bands.

In some examples, to support transmitting the capability message, the capability message transmission manager 925 may be configured as or otherwise support a means for transmitting an indication that the UE is capable of communications across the range of radio frequency spectrum bands via a single antenna module of the UE.

In some examples, to support transmitting the capability message, the capability message transmission manager 925 may be configured as or otherwise support a means for transmitting an indication that the UE is capable of de-activating antenna elements of the antenna module of the UE.

Additionally or alternatively, the communications manager 920 may support wireless communications at a UE in accordance with examples as disclosed herein. In some examples, the capability message transmission manager 925 may be configured as or otherwise support a means for transmitting, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The frequency request manager 950 may be configured as or otherwise support a means for transmitting, to the base station, a request for the base station to transmit positioning reference signals to the UE using a set of radio frequency spectrum bands that is different than the subset of radio frequency spectrum bands. In some examples, the reference signal reception manager 945 may be configured as or otherwise support a means for receiving, from the base station, a first positioning reference signal via a first radio frequency spectrum band based on the request, where the first radio frequency spectrum band is included in the set of radio frequency spectrum bands.

In some examples, the reference signal parameter manager 970 may be configured as or otherwise support a means for measuring a signal strength of the first positioning reference signal received via the first radio frequency spectrum band. In some examples, the reference signal parameter manager 970 may be configured as or otherwise support a means for transmitting the signal strength of the first positioning reference signal for downlink angle of departure estimation.

In some examples, the reference signal reception manager 945 may be configured as or otherwise support a means for receiving, from the base station, a second positioning reference signal via a second radio frequency spectrum band, where the second radio frequency spectrum band is included in the subset of radio frequency spectrum bands.

In some examples, the reference signal parameter manager 970 may be configured as or otherwise support a means for measuring a signal strength of the first positioning reference signal received via the first radio frequency spectrum band and a signal strength of the second positioning reference signal received via the second radio frequency spectrum band. In some examples, the reference signal parameter manager 970 may be configured as or otherwise support a means for transmitting the signal strength of the first positioning reference signal and the signal strength of the second positioning reference signal for downlink angle of departure estimation.

In some examples, the reference signal parameter manager 970 may be configured as or otherwise support a means for measuring a signal strength of the first positioning reference signal received via the first radio frequency spectrum band or a signal strength of the second positioning reference signal received via the second radio frequency spectrum band, or both. In some examples, the reference signal parameter manager 970 may be configured as or otherwise support a means for measuring a TDoA of the first positioning reference signal, a TDoA of the second positioning reference signal, or both. In some examples, the position indication manager 980 may be configured as or otherwise support a means for transmitting an indication of a position of the UE relative to the base station based on the signal strength of the first positioning reference signal, the signal strength of the second positioning reference signal, the TDoA of the first positioning reference signal, the TDoA of the second positioning reference signal, or a combination thereof.

In some examples, the reference signal parameter manager 970 may be configured as or otherwise support a means for receiving, from a location management function, communications information associated with the first positioning reference signal, or the second positioning reference signal, or both, the communications information including a beam shape, a beam pattern, a peak or boresight direction of array gain, or an array gain pattern as a function of spatial angles, or a combination thereof.

In some examples, to support transmitting the capability message, the grating lobe indication manager 975 may be configured as or otherwise support a means for transmitting an indication that beam weights used at the UE will result in grating lobes in the subset of radio frequency spectrum bands of the range of radio frequency spectrum bands based on the inter-antenna element spacing of the antenna module of the UE being greater than half of the wavelength in at least the subset of radio frequency spectrum bands.

In some examples, to support transmitting the capability message, the capability message transmission manager 925 may be configured as or otherwise support a means for transmitting an indication that the UE is capable of communications across the range of radio frequency spectrum bands via a single antenna module of the UE.

Figure 10:
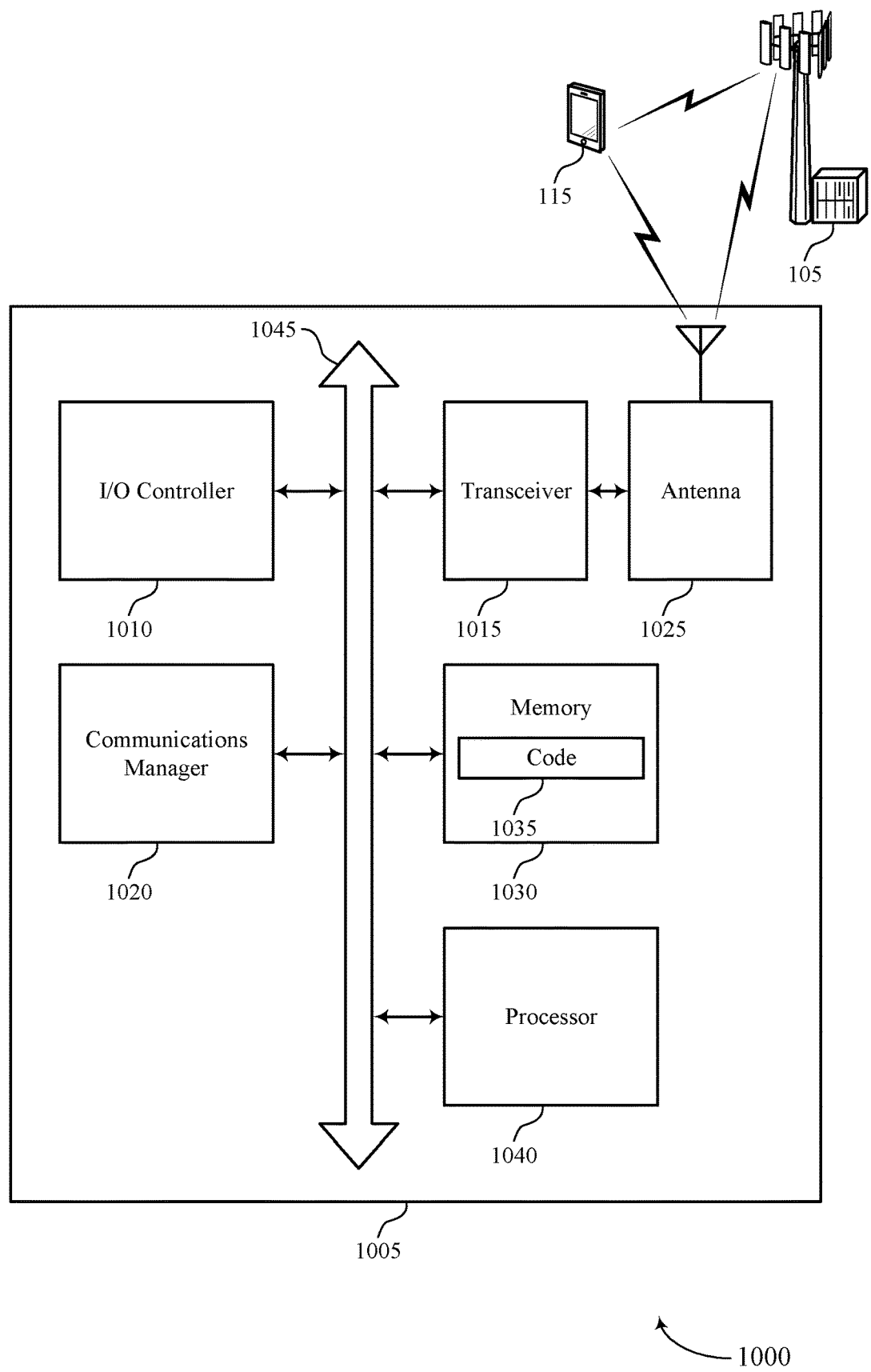
FIG. 10 shows a diagram of a system including a device that supports techniques for improving angle-based positioning procedures in ultra-wide bandwidth systems in accordance with aspects of the present disclosure.

FIG. 10 shows a diagram of a system 1000 including a device 1005 that supports techniques for improving angle-based positioning procedures in ultra-wide bandwidth systems in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for improving angle-based positioning procedures in ultra-wide bandwidth systems). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The communications manager 1020 may be configured as or otherwise support a means for receiving control signaling indicating that the UE is configured to transmit a positioning reference signal to the base station on a first radio frequency spectrum band of the subset of radio frequency spectrum bands. The communications manager 1020 may be configured as or otherwise support a means for de-activating one or more antenna elements of the antenna module based on a wavelength of the first radio frequency spectrum band and the inter-antenna element spacing. The communications manager 1020 may be configured as or otherwise support a means for transmitting the positioning reference signal via one or more active antenna elements of the antenna module.

Additionally or alternatively, the communications manager 1020 may support wireless communications at a UE in accordance with examples as disclosed herein. For example, the communications manager 1020 may be configured as or otherwise support a means for transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The communications manager 1020 may be configured as or otherwise support a means for receiving control signaling indicating that the UE is configured to receive a positioning reference signal from the base station on a first radio frequency spectrum band of the subset of radio frequency spectrum bands. The communications manager 1020 may be configured as or otherwise support a means for de-activating one or more antenna elements of the antenna module based on a wavelength of the first radio frequency spectrum band and the inter-antenna element spacing. The communications manager 1020 may be configured as or otherwise support a means for receiving the positioning reference signal via one or more active antenna elements of the antenna module.

Additionally or alternatively, the communications manager 1020 may support wireless communications at a UE in accordance with examples as disclosed herein. For example, the communications manager 1020 may be configured as or otherwise support a means for transmitting, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The communications manager 1020 may be configured as or otherwise support a means for transmitting, to the base station, a request for the base station to transmit positioning reference signals to the UE using a set of radio frequency spectrum bands that is different than the subset of radio frequency spectrum bands. The communications manager 1020 may be configured as or otherwise support a means for receiving, from the base station, a first positioning reference signal via a first radio frequency spectrum band based on the request, where the first radio frequency spectrum band is included in the set of radio frequency spectrum bands.

By including or configuring the communications manager 1020 in accordance with examples as described herein, the device 1005 may support techniques for improved communication reliability, reduced latency, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for improving angle-based positioning procedures in ultra-wide bandwidth systems as described herein, or the processor 1040 and the memory 1030 may be otherwise configured to perform or support such operations.

Figure 11:
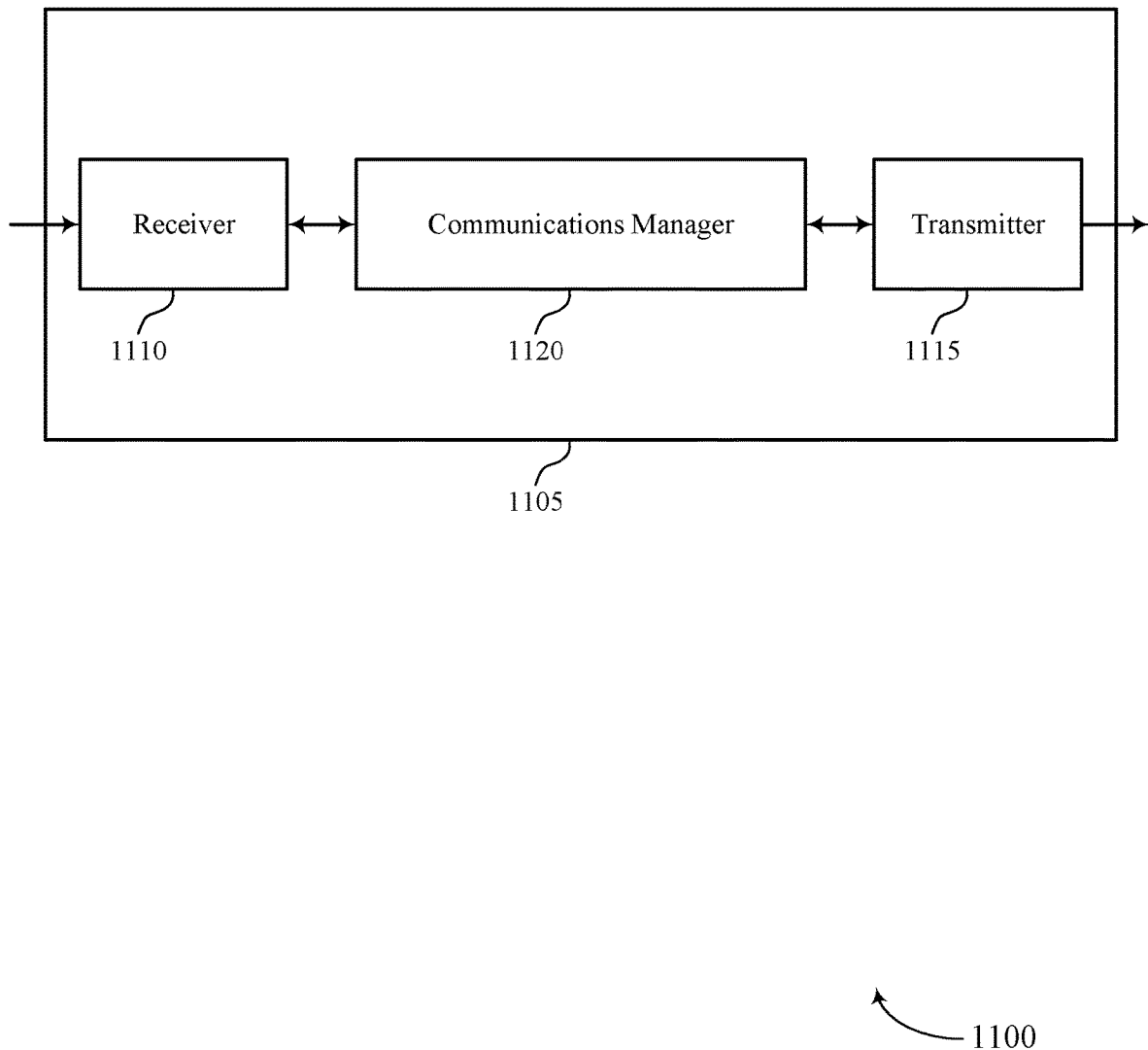
FIGS. 11 and 12 show block diagrams of devices that support techniques for improving angle-based positioning procedures in ultra-wide bandwidth systems in accordance with aspects of the present disclosure.

FIG. 11 shows a block diagram 1100 of a device 1105 that supports techniques for improving angle-based positioning procedures in ultra-wide bandwidth systems in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for improving angle-based positioning procedures in ultra-wide bandwidth systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for improving angle-based positioning procedures in ultra-wide bandwidth systems). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for improving angle-based positioning procedures in ultra-wide bandwidth systems as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network device in accordance with examples as disclosed herein. For example, the communications manager 1120 may be configured as or otherwise support a means for receiving a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The communications manager 1120 may be configured as or otherwise support a means for receiving, from the UE, a request for the network device to transmit positioning reference signals to the UE using a set of radio frequency spectrum bands that is different than the subset of radio frequency spectrum bands. The communications manager 1120 may be configured as or otherwise support a means for transmitting, to the UE, a first positioning reference signal via a first radio frequency spectrum band based on the request, where the first radio frequency spectrum band is included in the set of radio frequency spectrum bands.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources.

Figure 12:
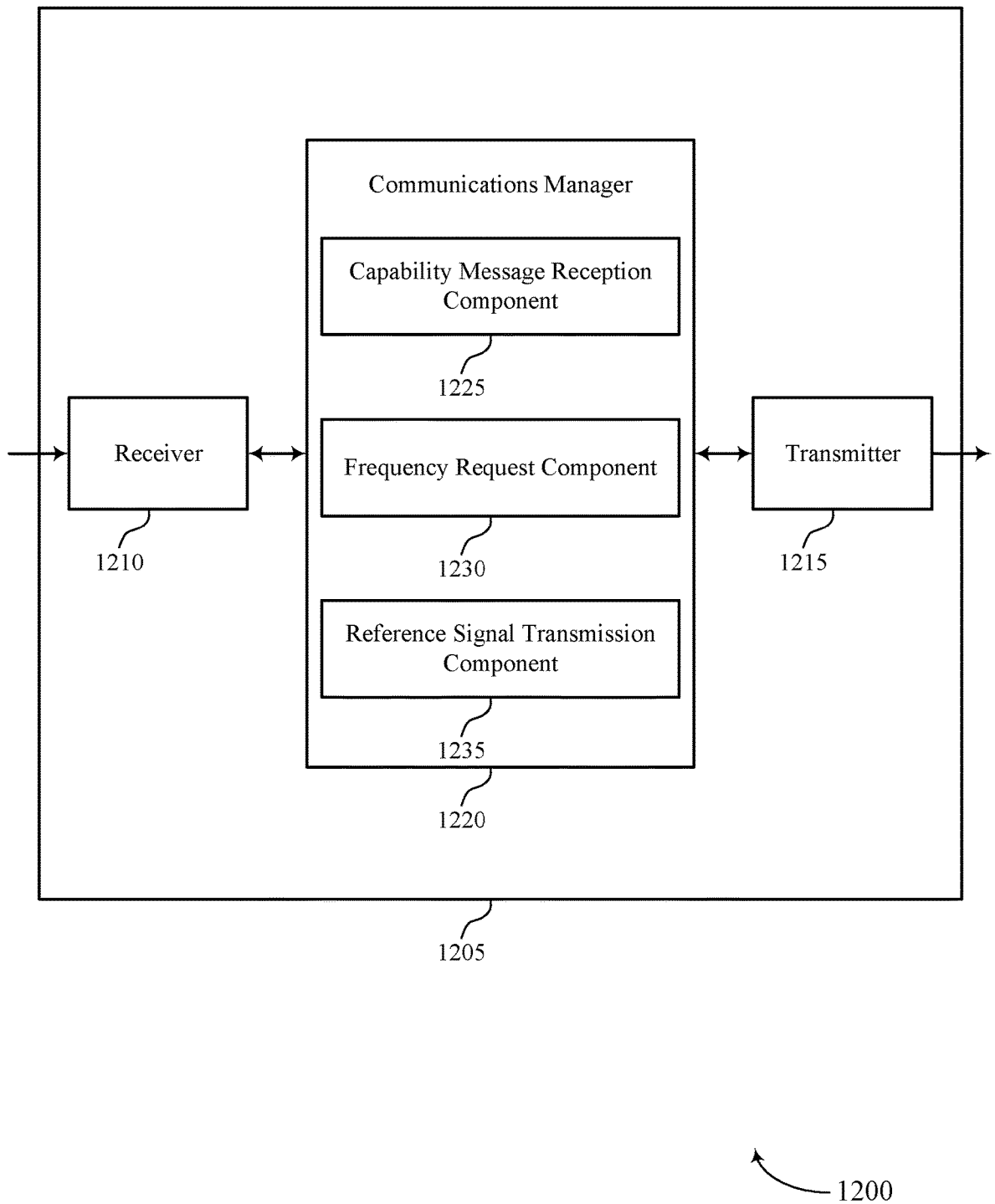

FIG. 12 shows a block diagram 1200 of a device 1205 that supports techniques for improving angle-based positioning procedures in ultra-wide bandwidth systems in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for improving angle-based positioning procedures in ultra-wide bandwidth systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for improving angle-based positioning procedures in ultra-wide bandwidth systems). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for improving angle-based positioning procedures in ultra-wide bandwidth systems as described herein. For example, the communications manager 1220 may include a capability message reception component 1225, a frequency request component 1230, a reference signal transmission component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network device in accordance with examples as disclosed herein. The capability message reception component 1225 may be configured as or otherwise support a means for receiving a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The frequency request component 1230 may be configured as or otherwise support a means for receiving, from the UE, a request for the network device to transmit positioning reference signals to the UE using a set of radio frequency spectrum bands that is different than the subset of radio frequency spectrum bands. The reference signal transmission component 1235 may be configured as or otherwise support a means for transmitting, to the UE, a first positioning reference signal via a first radio frequency spectrum band based on the request, where the first radio frequency spectrum band is included in the set of radio frequency spectrum bands.

Figure 13:
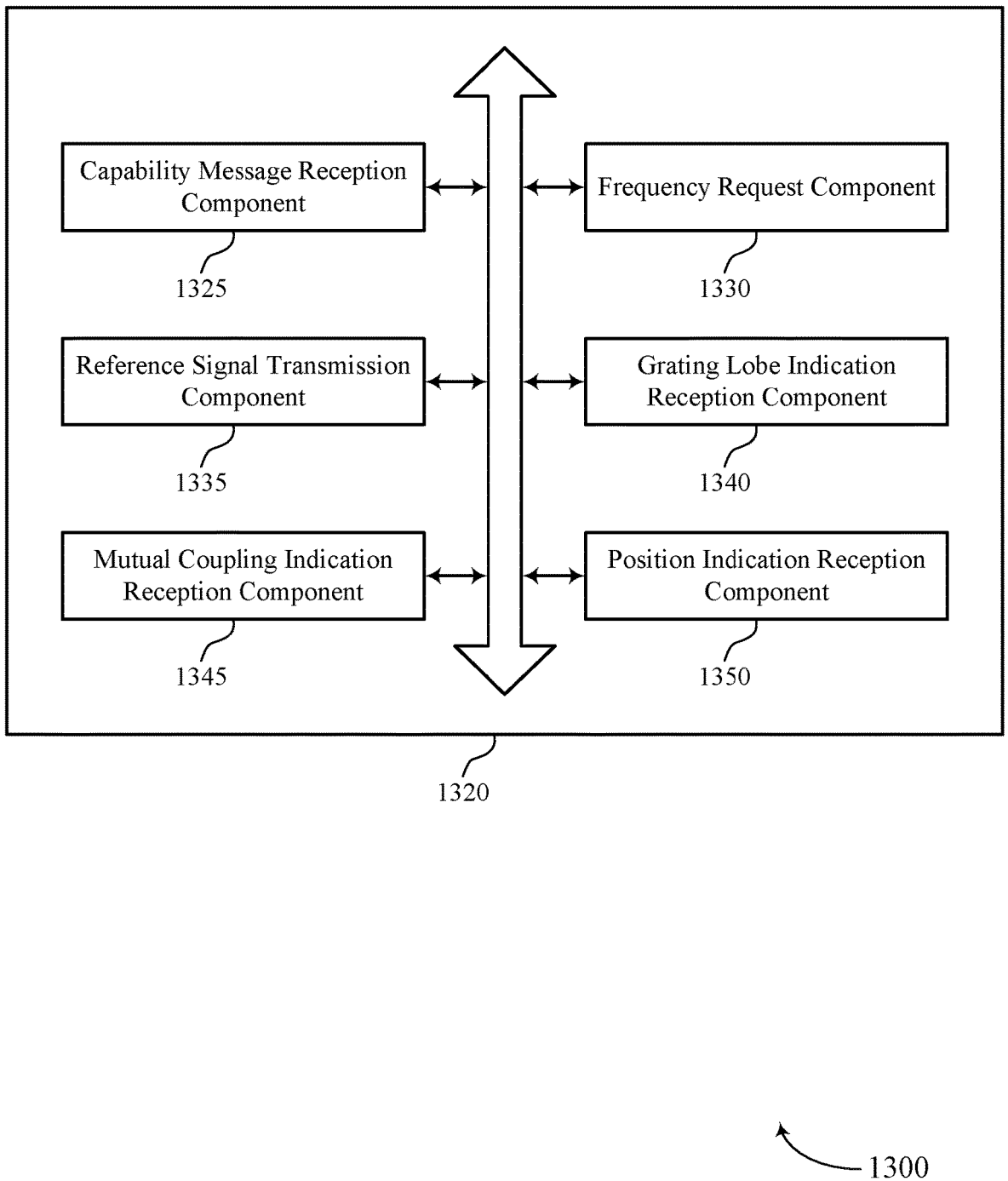
FIG. 13 shows a block diagram of a communications manager that supports techniques for improving angle-based positioning procedures in ultra-wide bandwidth systems in accordance with aspects of the present disclosure.

FIG. 13 shows a block diagram 1300 of a communications manager 1320 that supports techniques for improving angle-based positioning procedures in ultra-wide bandwidth systems in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for improving angle-based positioning procedures in ultra-wide bandwidth systems as described herein. For example, the communications manager 1320 may include a capability message reception component 1325, a frequency request component 1330, a reference signal transmission component 1335, a grating lobe indication reception component 1340, a mutual coupling indication reception component 1345, a position indication reception component 1350, or any combination thereof. Each of these components may communicate, directly or indirectly, with one another (e.g., via one or more buses).

The communications manager 1320 may support wireless communications at a network device in accordance with examples as disclosed herein. The capability message reception component 1325 may be configured as or otherwise support a means for receiving a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The frequency request component 1330 may be configured as or otherwise support a means for receiving, from the UE, a request for the network device to transmit positioning reference signals to the UE using a set of radio frequency spectrum bands that is different than the subset of radio frequency spectrum bands. The reference signal transmission component 1335 may be configured as or otherwise support a means for transmitting, to the UE, a first positioning reference signal via a first radio frequency spectrum band based on the request, where the first radio frequency spectrum band is included in the set of radio frequency spectrum bands.

In some examples, the reference signal transmission component 1335 may be configured as or otherwise support a means for transmitting, to the UE, a second positioning reference signal via a second radio frequency spectrum band, where the second radio frequency spectrum band is included in the subset of radio frequency spectrum bands.

In some examples, the position indication reception component 1350 may be configured as or otherwise support a means for receiving an indication of a position of the UE relative to the network device based on a signal strength of the first positioning reference signal, a signal strength of the second positioning reference signal, a TDoA of the first positioning reference signal, a TDoA of the second positioning reference signal, or a combination thereof.

In some examples, to support receiving the capability message, the grating lobe indication reception component 1340 may be configured as or otherwise support a means for receiving an indication that beam weights used at the UE will result in grating lobes in the subset of radio frequency spectrum bands of the range of radio frequency spectrum bands based on the inter-antenna element spacing of the antenna module of the UE being greater than half of the wavelength in at least the subset of radio frequency spectrum bands.

In some examples, to support receiving the capability message, the mutual coupling indication reception component 1345 may be configured as or otherwise support a means for receiving an indication that mutual coupling will occur at the UE in a second subset of radio frequency spectrum bands of the range of radio frequency spectrum bands based on the inter-antenna element spacing of the antenna module of the UE being less than half of the wavelength in at least the second subset of radio frequency spectrum bands. In some examples, to support receiving the capability message, the reference signal transmission component 1335 may be configured as or otherwise support a means for transmitting, to the UE, the first positioning reference signal via the first radio frequency spectrum band based on the indication that mutual coupling will occur at the UE in the second subset of radio frequency spectrum bands, the first radio frequency spectrum band included in the set of radio frequency spectrum bands different from the second subset of radio frequency spectrum bands.

In some examples, to support receiving the capability message, the capability message reception component 1325 may be configured as or otherwise support a means for receiving an indication that the UE is capable of communications across the range of radio frequency spectrum bands via a single antenna module of the UE.

Figure 14:
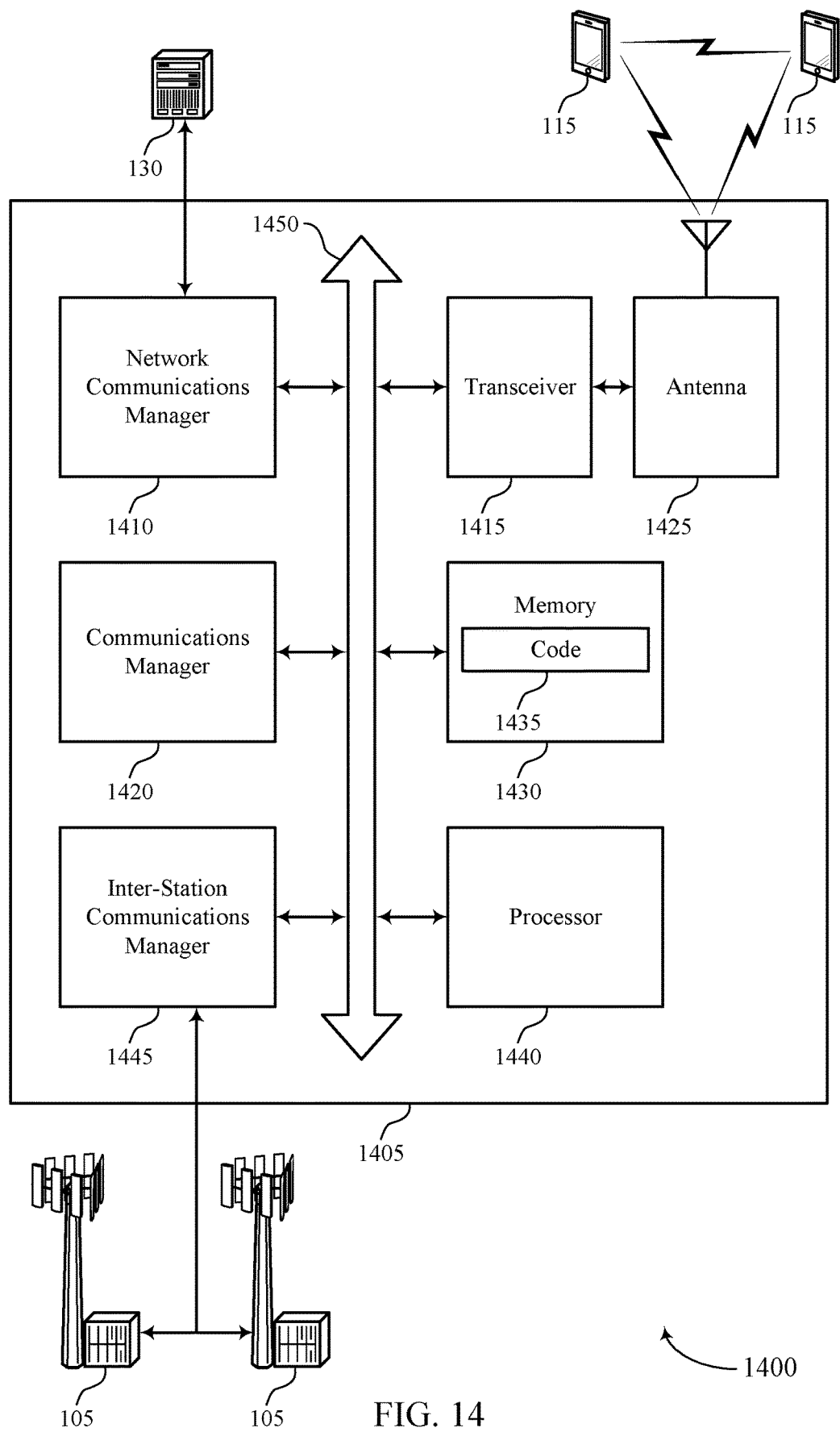
FIG. 14 shows a diagram of a system including a device that supports techniques for improving angle-based positioning procedures in ultra-wide bandwidth systems in accordance with aspects of the present disclosure.

FIG. 14 shows a diagram of a system 1400 including a device 1405 that supports techniques for improving angle-based positioning procedures in ultra-wide bandwidth systems in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for improving angle-based positioning procedures in ultra-wide bandwidth systems). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a network device in accordance with examples as disclosed herein. For example, the communications manager 1420 may be configured as or otherwise support a means for receiving a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The communications manager 1420 may be configured as or otherwise support a means for receiving, from the UE, a request for the network device to transmit positioning reference signals to the UE using a set of radio frequency spectrum bands that is different than the subset of radio frequency spectrum bands. The communications manager 1420 may be configured as or otherwise support a means for transmitting, to the UE, a first positioning reference signal via a first radio frequency spectrum band based on the request, where the first radio frequency spectrum band is included in the set of radio frequency spectrum bands.

By including or configuring the communications manager 1420 in accordance with examples as described herein, the device 1405 may support techniques for improved communication reliability, reduced latency, more efficient utilization of communication resources, and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for improving angle-based positioning procedures in ultra-wide bandwidth systems as described herein, or the processor 1440 and the memory 1430 may be otherwise configured to perform or support such operations.

Figure 15:
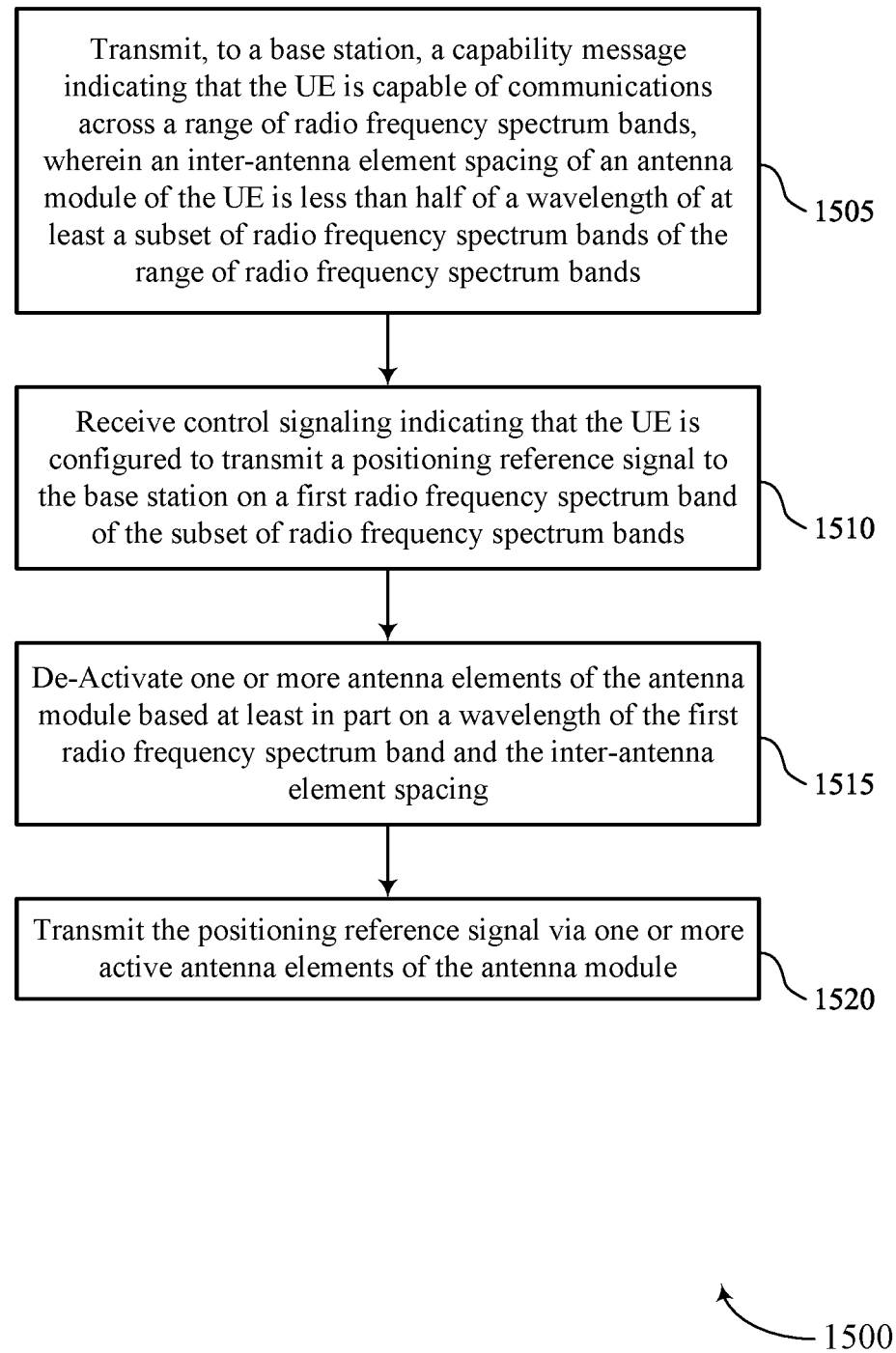
FIGS. 15 through 18 show flowcharts illustrating methods that support techniques for improving angle-based positioning procedures in ultra-wide bandwidth systems in accordance with aspects of the present disclosure.

FIG. 15 shows a flowchart illustrating a method 1500 that supports techniques for improving angle-based positioning procedures in ultra-wide bandwidth systems in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The operations of 1505 may be performed in accordance with examples as disclosed herein. In some examples, aspects of the operations of 1505 may be performed by a capability message transmission manager 925 as described with reference to FIG. 9.

At 1510, the method may include receiving control signaling indicating that the UE is configured to transmit a positioning reference signal to the base station on a first radio frequency spectrum band of the subset of radio frequency spectrum bands. The operations of 1510 may be performed in accordance with examples as disclosed herein. In some examples, aspects of the operations of 1510 may be performed by a control signal reception manager 930 as described with reference to FIG. 9.

At 1515, the method may include de-activating one or more antenna elements of the antenna module based on a wavelength of the first radio frequency spectrum band and the inter-antenna element spacing. The operations of 1515 may be performed in accordance with examples as disclosed herein. In some examples, aspects of the operations of 1515 may be performed by an antenna element de-activation manager 935 as described with reference to FIG. 9.

At 1520, the method may include transmitting the positioning reference signal via one or more active antenna elements of the antenna module. The operations of 1520 may be performed in accordance with examples as disclosed herein. In some examples, aspects of the operations of 1520 may be performed by a reference signal transmission manager 940 as described with reference to FIG. 9.

Figure 16:
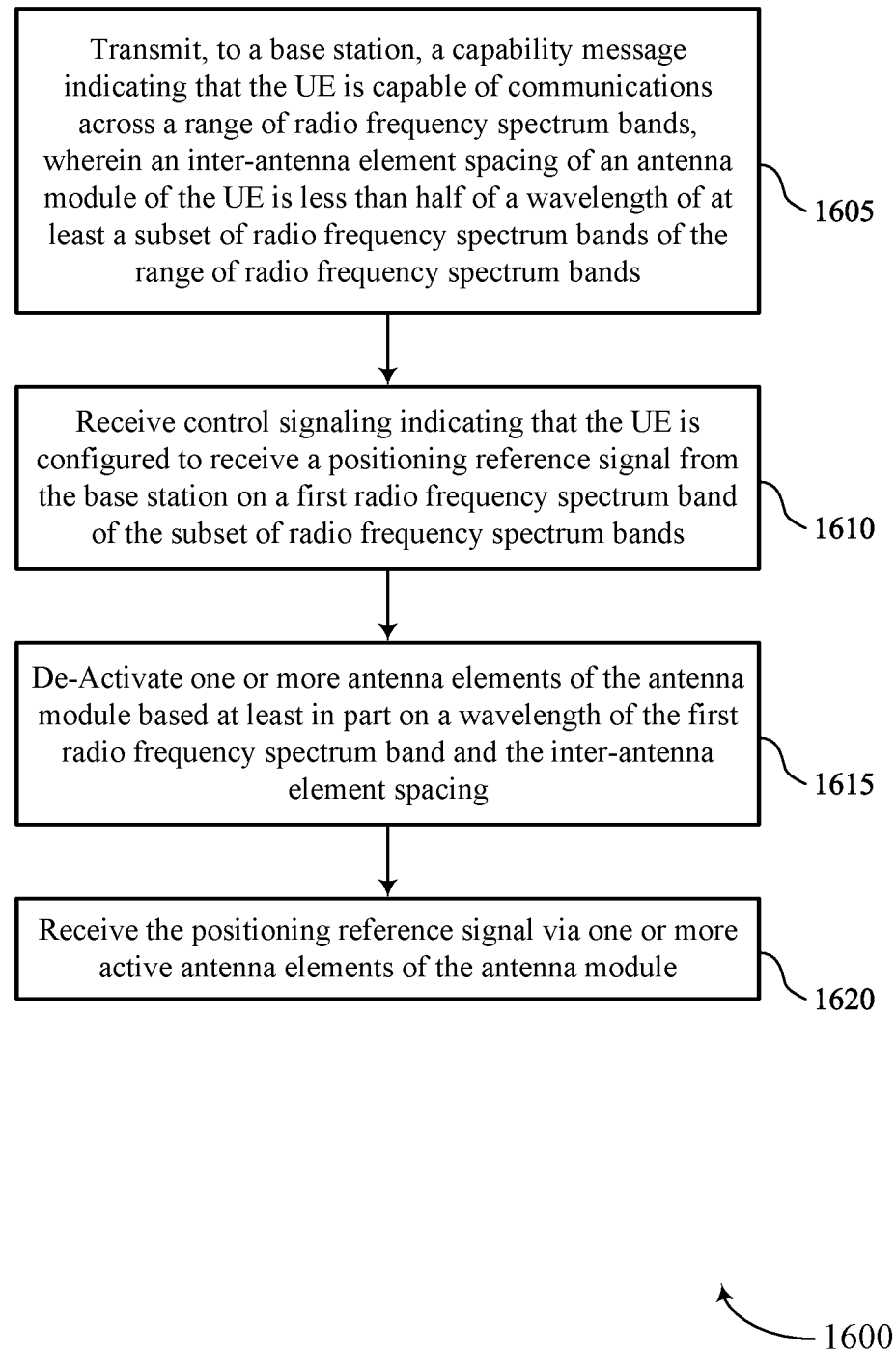

FIG. 16 shows a flowchart illustrating a method 1600 that supports techniques for improving angle-based positioning procedures in ultra-wide bandwidth systems in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, a capability message indicating that the UE is capable of communications across a range of radio frequency spectrum bands, where an inter-antenna element spacing of an antenna module of the UE is less than half of a wavelength of at least a subset of radio frequency spectrum bands of the range of radio frequency spectrum bands. The operations of 1605 may be performed in accordance with examples as disclosed herein. In some examples, aspects of the operations of 1605 may be performed by a capability message transmission manager 925 as described with reference to FIG. 9.

At 1610, the method may include receiving control signaling indicating that the UE is configured to receive a positioning reference signal from the base station on a first radio frequency spectrum band of the subset of radio frequency spectrum bands. The operations of 1610 may be performed in accordance with examples as disclosed herein. In some examples, aspects of the operations of 1610 may be performed by a control signal reception manager 930 as described with reference to FIG. 9.

At 1615, the method may include de-activating one or more antenna elements of the antenna module based on a wavelength of the first radio frequency spectrum band and the inter-antenna element spacing. The operations of 1615 may be performed in accordance with examples as disclosed herein. In some examples, aspects of the operations of 1615 may be performed by an antenna element de-activation manager 935 as described with reference to FIG. 9.

At 1620, the method may include receiving the positioning reference signal via one or more active antenna elements of the antenna module. The operations of 1620 may be performed in accordance with examples as disclosed herein. In some examples, aspects of the operations of 1620 may be performed by a reference signal reception manager 945 as described with reference to FIG. 9.

Figure 17:
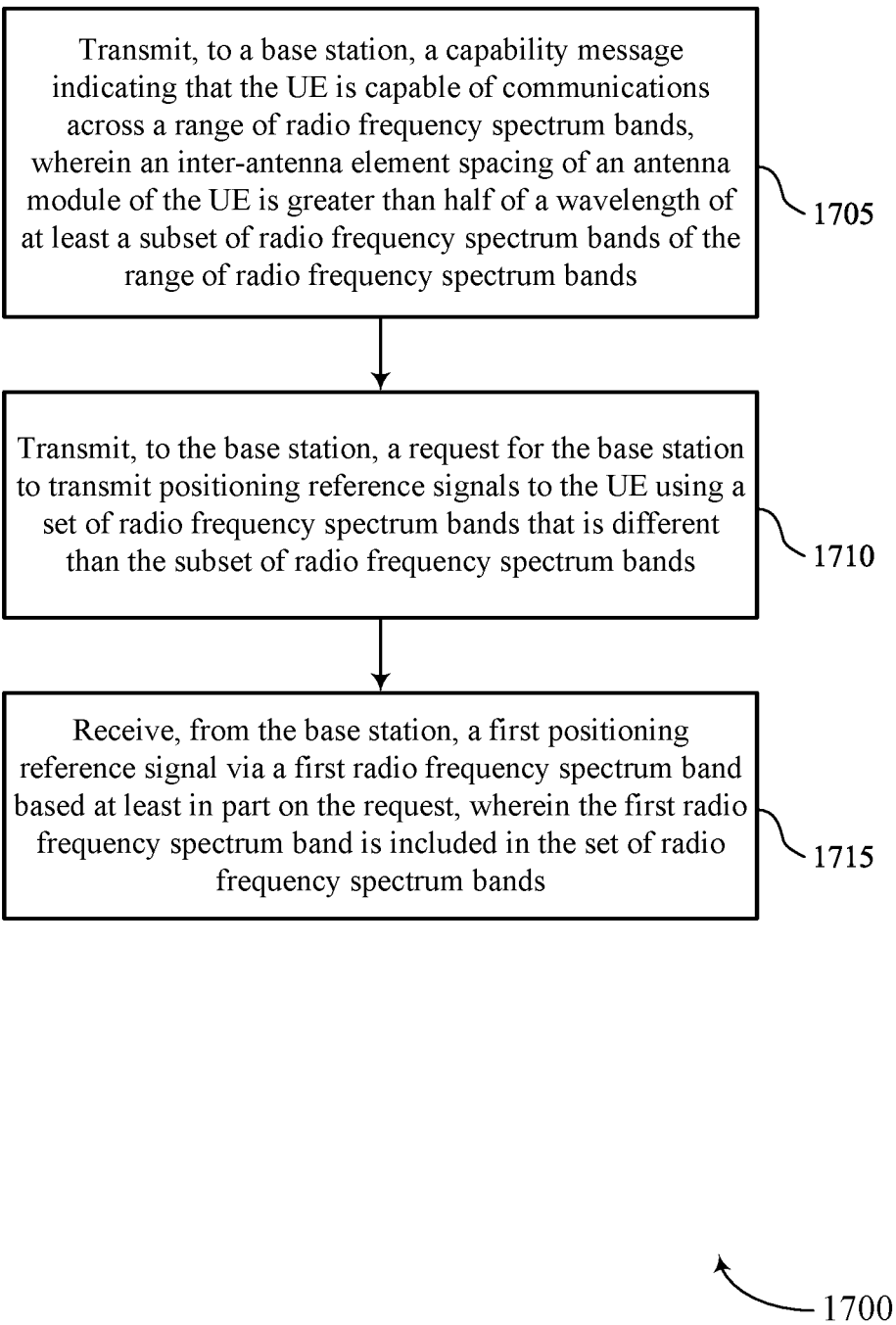

FIG. 17 shows a flowchart illustrating a method 1700 that supports techniques for improving angle-based positioning procedures in ultra-wide bandwidth systems in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include transmitting, to a base station, a capability message indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The operations of 1705 may be performed in accordance with examples as disclosed herein. In some examples, aspects of the operations of 1705 may be performed by a capability message transmission manager 925 as described with reference to FIG. 9.

At 1710, the method may include transmitting, to the base station, a request for the base station to transmit positioning reference signals to the UE using a set of radio frequency spectrum bands that is different than the subset of radio frequency spectrum bands. The operations of 1710 may be performed in accordance with examples as disclosed herein. In some examples, aspects of the operations of 1710 may be performed by a frequency request manager 950 as described with reference to FIG. 9.

At 1715, the method may include receiving, from the base station, a first positioning reference signal via a first radio frequency spectrum band based on the request, where the first radio frequency spectrum band is included in the set of radio frequency spectrum bands. The operations of 1715 may be performed in accordance with examples as disclosed herein. In some examples, aspects of the operations of 1715 may be performed by a reference signal reception manager 945 as described with reference to FIG. 9.

Figure 18:
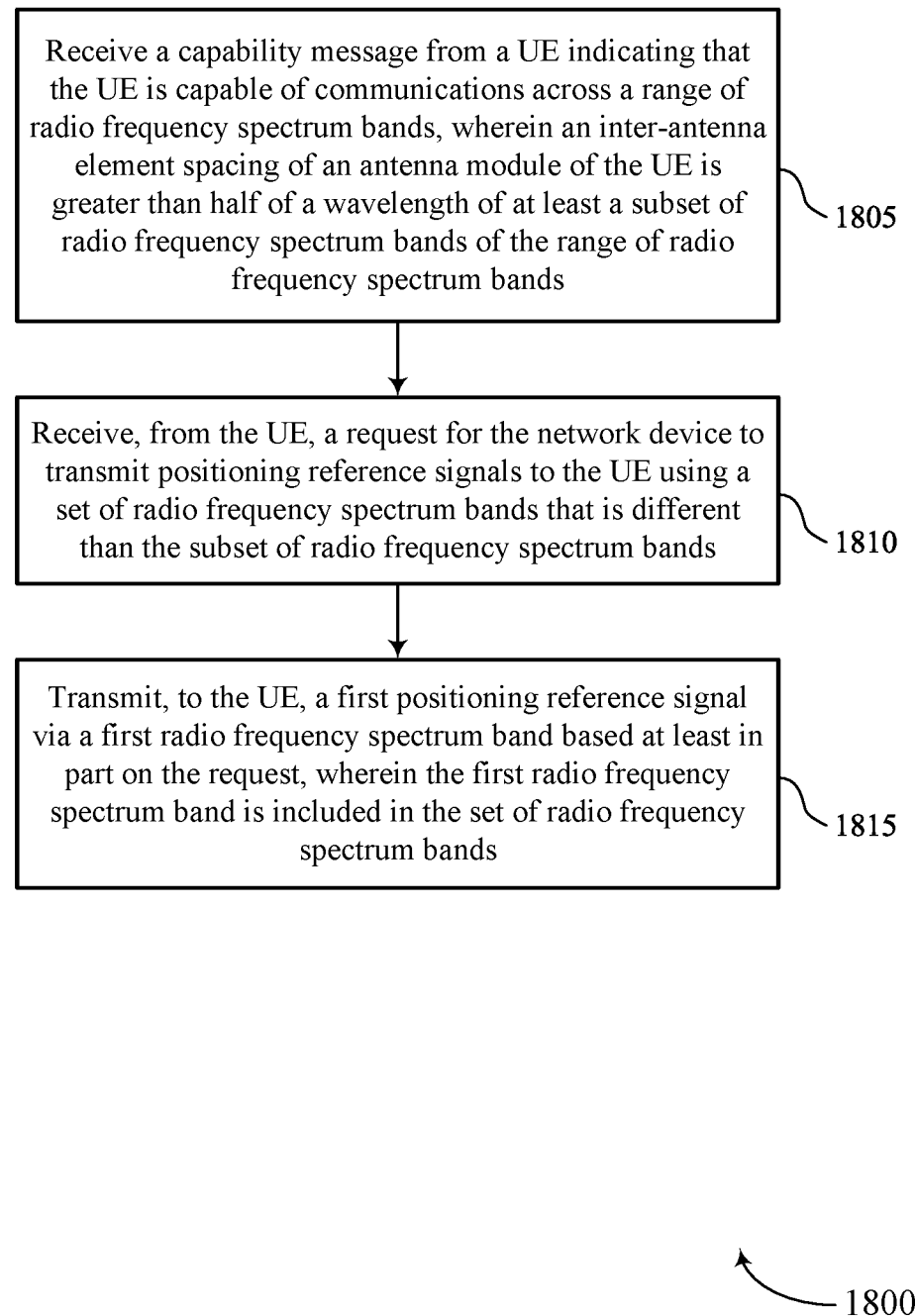

FIG. 18 shows a flowchart illustrating a method 1800 that supports techniques for improving angle-based positioning procedures in ultra-wide bandwidth systems in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving a capability message from a UE indicating that the UE is capable of communications across a range of radio frequency spectrum bands, where an inter-antenna element spacing of an antenna module of the UE is greater than half of a wavelength of at least a subset of radio frequency spectrum bands of the range of radio frequency spectrum bands. The operations of 1805 may be performed in accordance with examples as disclosed herein. In some examples, aspects of the operations of 1805 may be performed by a capability message reception component 1325 as described with reference to FIG. 13.

At 1810, the method may include receiving, from the UE, a request for the network device to transmit positioning reference signals to the UE using a set of radio frequency spectrum bands that is different than the subset of radio frequency spectrum bands. The operations of 1810 may be performed in accordance with examples as disclosed herein. In some examples, aspects of the operations of 1810 may be performed by a frequency request component 1330 as described with reference to FIG. 13.

At 1815, the method may include transmitting, to the UE, a first positioning reference signal via a first radio frequency spectrum band based on the request, where the first radio frequency spectrum band is included in the set of radio frequency spectrum bands. The operations of 1815 may be performed in accordance with examples as disclosed herein. In some examples, aspects of the operations of 1815 may be performed by a reference signal transmission component 1335 as described with reference to FIG. 13.

The following provides an overview of aspects of the present disclosure:

Aspect 1: A method for wireless communications at a UE, comprising: transmitting, to a base station, a capability message indicating that the UE is capable of communications across a range of radio frequency spectrum bands, wherein an inter-antenna element spacing of an antenna module of the UE is less than half of a wavelength of at least a subset of radio frequency spectrum bands of the range of radio frequency spectrum bands; receiving control signaling indicating that the UE is configured to transmit a positioning reference signal to the base station on a first radio frequency spectrum band of the subset of radio frequency spectrum bands; de-activating one or more antenna elements of the antenna module based at least in part on a wavelength of the first radio frequency spectrum band and the inter-antenna element spacing; and transmitting the positioning reference signal via one or more active antenna elements of the antenna module.

Aspect 2: The method of aspect 1, further comprising: transmitting a request for the UE to increase transmission power of the positioning reference signal based at least in part on de-activating the one or more antenna elements.

Aspect 3: The method of any of aspects 1 through 2, further comprising: transmitting a request for the base station to transmit positioning reference signals to the UE using a set of radio frequency spectrum bands that is different than the subset of radio frequency spectrum bands.

Aspect 4: The method of any of aspects 1 through 3, further comprising: identifying that the inter-antenna element spacing of the antenna module of the UE is less than half the wavelength of the first radio frequency spectrum band; and determining to increase the inter-antenna element spacing between active antenna elements of the antenna module of the UE by de-activating the one or more antenna elements based at least in part on the inter-antenna element spacing of the antenna module of the UE being less than half the wavelength of the first radio frequency spectrum band.

Aspect 5: The method of any of aspects 1 through 4, wherein transmitting the capability message further comprises: transmitting an indication that mutual coupling will occur at the UE in the subset of radio frequency spectrum bands of the range of radio frequency spectrum bands based at least in part on the inter-antenna element spacing of the antenna module of the UE being less than half of the wavelength in at least the subset of radio frequency spectrum bands.

Aspect 6: The method of any of aspects 1 through 5, wherein transmitting the capability message further comprises: transmitting an indication that the UE is capable of communications across the range of radio frequency spectrum bands via a single antenna module of the UE.

Aspect 7: The method of any of aspects 1 through 6, wherein transmitting the capability message further comprises: transmitting an indication that the UE is capable of de-activating antenna elements of the antenna module of the UE.

Aspect 8: A method for wireless communications at a UE, comprising: transmitting, to a base station, a capability message indicating that the UE is capable of communications across a range of radio frequency spectrum bands, wherein an inter-antenna element spacing of an antenna module of the UE is less than half of a wavelength of at least a subset of radio frequency spectrum bands of the range of radio frequency spectrum bands; receiving control signaling indicating that the UE is configured to receive a positioning reference signal from the base station on a first radio frequency spectrum band of the subset of radio frequency spectrum bands; de-activating one or more antenna elements of the antenna module based at least in part on a wavelength of the first radio frequency spectrum band and the inter-antenna element spacing; and receiving the positioning reference signal via one or more active antenna elements of the antenna module.

Aspect 9: The method of aspect 8, further comprising: transmitting a request for the base station to increase transmission power of the positioning reference signal based at least in part on de-activating the one or more antenna elements.

Aspect 10: The method of any of aspects 8 through 9, further comprising: transmitting a request for the base station to transmit positioning reference signals to the UE using a set of radio frequency spectrum bands that is different than the subset of radio frequency spectrum bands.

Aspect 11: The method of any of aspects 8 through 10, further comprising: identifying that the inter-antenna element spacing of the antenna module of the UE is less than half the wavelength of the first radio frequency spectrum band; and determining to increase the inter-antenna element spacing between active antenna elements of the antenna module of the UE by de-activating the one or more antenna elements based at least in part on the inter-antenna element spacing of the antenna module of the UE being less than half the wavelength of the first radio frequency spectrum band.

Aspect 12: The method of any of aspects 8 through 11, further comprising: measuring a signal strength of the positioning reference signal received via the one or more active antenna elements of the antenna module; and transmitting the signal strength of the positioning reference signal for downlink angle of departure estimation.

Aspect 13: The method of any of aspects 8 through 12, further comprising: receiving, from a location management function, communications information associated with the positioning reference signal received by the UE, the communications information comprising a beam shape, a beam pattern, a peak or boresight direction of array gain, or an array gain pattern as a function of angles, or a combination thereof.

Aspect 14: The method of any of aspects 8 through 13, wherein transmitting the capability message further comprises: transmitting an indication that mutual coupling will occur at the UE in the subset of radio frequency spectrum bands of the range of radio frequency spectrum bands based at least in part on the inter-antenna element spacing of the antenna module of the UE being less than half of the wavelength in at least the subset of radio frequency spectrum bands.

Aspect 15: The method of any of aspects 8 through 14, wherein transmitting the capability message further comprises: transmitting an indication that the UE is capable of communications across the range of radio frequency spectrum bands via a single antenna module of the UE.

Aspect 16: The method of any of aspects 8 through 15, wherein transmitting the capability message further comprises: transmitting an indication that the UE is capable of de-activating antenna elements of the antenna module of the UE.

Aspect 17: A method for wireless communications at a UE, comprising: transmitting, to a base station, a capability message indicating that the UE is capable of communications across a range of radio frequency spectrum bands, wherein an inter-antenna element spacing of an antenna module of the UE is greater than half of a wavelength of at least a subset of radio frequency spectrum bands of the range of radio frequency spectrum bands; transmitting, to the base station, a request for the base station to transmit positioning reference signals to the UE using a set of radio frequency spectrum bands that is different than the subset of radio frequency spectrum bands; and receiving, from the base station, a first positioning reference signal via a first radio frequency spectrum band based at least in part on the request, wherein the first radio frequency spectrum band is included in the set of radio frequency spectrum bands.

Aspect 18: The method of aspect 17, further comprising: measuring a signal strength of the first positioning reference signal received via the first radio frequency spectrum band; and transmitting the signal strength of the first positioning reference signal for downlink angle of departure estimation.

Aspect 19: The method of any of aspects 17 through 18, further comprising: receiving, from the base station, a second positioning reference signal via a second radio frequency spectrum band, wherein the second radio frequency spectrum band is included in the subset of radio frequency spectrum bands.

Aspect 20: The method of aspect 19, further comprising: measuring a signal strength of the first positioning reference signal received via the first radio frequency spectrum band and a signal strength of the second positioning reference signal received via the second radio frequency spectrum band; and transmitting the signal strength of the first positioning reference signal and the signal strength of the second positioning reference signal for downlink angle of departure estimation.

Aspect 21: The method of any of aspects 19 through 20, further comprising: measuring a signal strength of the first positioning reference signal received via the first radio frequency spectrum band or a signal strength of the second positioning reference signal received via the second radio frequency spectrum band, or both; measuring a time-difference of arrival of the first positioning reference signal, a time-difference of arrival of the second positioning reference signal, or both; and transmitting an indication of a position of the UE relative to the base station based at least in part on the signal strength of the first positioning reference signal, the signal strength of the second positioning reference signal, the time-difference of arrival of the first positioning reference signal, the time-difference of arrival of the second positioning reference signal, or a combination thereof.

Aspect 22: The method of any of aspects 19 through 21, further comprising: receiving, from a location management function, communications information associated with the first positioning reference signal, or the second positioning reference signal, or both, the communications information comprising a beam shape, a beam pattern, a peak or boresight direction of array gain, or an array gain pattern as a function of spatial angles, or a combination thereof.

Aspect 23: The method of any of aspects 17 through 22, wherein transmitting the capability message further comprises: transmitting an indication that beam weights used at the UE will result in grating lobes in the subset of radio frequency spectrum bands of the range of radio frequency spectrum bands based at least in part on the inter-antenna element spacing of the antenna module of the UE being greater than half of the wavelength in at least the subset of radio frequency spectrum bands.

Aspect 24: The method of any of aspects 17 through 23, wherein transmitting the capability message further comprises: transmitting an indication that the UE is capable of communications across the range of radio frequency spectrum bands via a single antenna module of the UE.

Aspect 25: A method for wireless communications at a network device, comprising: receiving a capability message from a UE indicating that the UE is capable of communications across a range of radio frequency spectrum bands, wherein an inter-antenna element spacing of an antenna module of the UE is greater than half of a wavelength of at least a subset of radio frequency spectrum bands of the range of radio frequency spectrum bands; receiving, from the UE, a request for the network device to transmit positioning reference signals to the UE using a set of radio frequency spectrum bands that is different than the subset of radio frequency spectrum bands; and transmitting, to the UE, a first positioning reference signal via a first radio frequency spectrum band based at least in part on the request, wherein the first radio frequency spectrum band is included in the set of radio frequency spectrum bands.

Aspect 26: The method of aspect 25, further comprising: transmitting, to the UE, a second positioning reference signal via a second radio frequency spectrum band, wherein the second radio frequency spectrum band is included in the subset of radio frequency spectrum bands.

Aspect 27: The method of aspect 26, further comprising: receiving an indication of a position of the UE relative to the network device based at least in part on a signal strength of the first positioning reference signal, a signal strength of the second positioning reference signal, a time-difference of arrival of the first positioning reference signal, a time-difference of arrival of the second positioning reference signal, or a combination thereof.

Aspect 28: The method of any of aspects 25 through 27, wherein receiving the capability message further comprises: receiving an indication that beam weights used at the UE will result in grating lobes in the subset of radio frequency spectrum bands of the range of radio frequency spectrum bands based at least in part on the inter-antenna element spacing of the antenna module of the UE being greater than half of the wavelength in at least the subset of radio frequency spectrum bands.

Aspect 29: The method of any of aspects 25 through 28, wherein receiving the capability message further comprises: receiving an indication that mutual coupling will occur at the UE in a second subset of radio frequency spectrum bands of the range of radio frequency spectrum bands based at least in part on the inter-antenna element spacing of the antenna module of the UE being less than half of the wavelength in at least the second subset of radio frequency spectrum bands; and transmitting, to the UE, the first positioning reference signal via the first radio frequency spectrum band based at least in part on the indication that mutual coupling will occur at the UE in the second subset of radio frequency spectrum bands, the first radio frequency spectrum band included in the set of radio frequency spectrum bands different from the second subset of radio frequency spectrum bands.

Aspect 30: The method of any of aspects 25 through 29, wherein receiving the capability message further comprises: receiving an indication that the UE is capable of communications across the range of radio frequency spectrum bands via a single antenna module of the UE.

Aspect 31: An apparatus for wireless communications at a UE, comprising a processor; memory coupled with the processor; and instructions stored in the memory and executable by the processor to cause the apparatus to perform a method of any of aspects 1 through 7.

Aspect 32: An apparatus for wireless communications at a UE, comprising at least one means for performing a method of any of aspects 1 through 7.

Aspect 33: A non-transitory computer-readable medium storing code for wireless communications at a UE, the code comprising instructions executable by a processor to perform a method of any of aspects 1 through 7.

Aspect 34: An apparatus for wireless communications at a UE, comprising a processor; memory coupled with the processor; and instructions stored in the memory and executable by the processor to cause the apparatus to perform a method of any of aspects 8 through 16.

Aspect 35: An apparatus for wireless communications at a UE, comprising at least one means for performing a method of any of aspects 8 through 16.

Aspect 36: A non-transitory computer-readable medium storing code for wireless communications at a UE, the code comprising instructions executable by a processor to perform a method of any of aspects 8 through 16.

Aspect 37: An apparatus for wireless communications at a UE, comprising a processor; memory coupled with the processor; and instructions stored in the memory and executable by the processor to cause the apparatus to perform a method of any of aspects 17 through 24.

Aspect 38: An apparatus for wireless communications at a UE, comprising at least one means for performing a method of any of aspects 17 through 24.

Aspect 39: A non-transitory computer-readable medium storing code for wireless communications at a UE, the code comprising instructions executable by a processor to perform a method of any of aspects 17 through 24.

Aspect 40: An apparatus for wireless communications at a network device, comprising a processor; memory coupled with the processor; and instructions stored in the memory and executable by the processor to cause the apparatus to perform a method of any of aspects 25 through 30.

Aspect 41: An apparatus for wireless communications at a network device, comprising at least one means for performing a method of any of aspects 25 through 30.

Aspect 42: A non-transitory computer-readable medium storing code for wireless communications at a network device, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
  transmitting, to a base station, a capability message indicating that the UE is capable of communications across a range of radio frequency spectrum bands, wherein an inter-antenna element spacing of an antenna module of the UE is less than half of a wavelength of at least a subset of radio frequency spectrum bands of the range of radio frequency spectrum bands;
  receiving control signaling indicating that the UE is configured to transmit a positioning reference signal to the base station on a first radio frequency spectrum band of the subset of radio frequency spectrum bands;
  de-activating one or more antenna elements of the antenna module based at least in part on a wavelength of the first radio frequency spectrum band and the inter-antenna element spacing; and
  transmitting the positioning reference signal via one or more active antenna elements of the antenna module.

2. The method of claim 1, further comprising:
  transmitting a request for the UE to increase transmission power of the positioning reference signal based at least in part on de-activating the one or more antenna elements.

3. The method of claim 1, further comprising:
  transmitting a request for the base station to transmit positioning reference signals to the UE using a set of radio frequency spectrum bands that is different than the subset of radio frequency spectrum bands.

4. The method of claim 1, further comprising:
  identifying that the inter-antenna element spacing of the antenna module of the UE is less than half the wavelength of the first radio frequency spectrum band; and
  determining to increase the inter-antenna element spacing between active antenna elements of the antenna module of the UE by de-activating the one or more antenna elements based at least in part on the inter-antenna element spacing of the antenna module of the UE being less than half the wavelength of the first radio frequency spectrum band.

5. The method of claim 1, wherein transmitting the capability message further comprises:
  transmitting an indication that mutual coupling will occur at the UE in the subset of radio frequency spectrum bands of the range of radio frequency spectrum bands based at least in part on the inter-antenna element spacing of the antenna module of the UE being less than half of the wavelength in at least the subset of radio frequency spectrum bands.

6. The method of claim 1, wherein transmitting the capability message further comprises:
  transmitting an indication that the UE is capable of communications across the range of radio frequency spectrum bands via a single antenna module of the UE.

7. The method of claim 1, wherein transmitting the capability message further comprises:
  transmitting an indication that the UE is capable of de-activating antenna elements of the antenna module of the UE.

8. A method for wireless communications at a user equipment (UE), comprising:
  transmitting, to a base station, a capability message indicating that the UE is capable of communications across a range of radio frequency spectrum bands, wherein an inter-antenna element spacing of an antenna module of the UE is less than half of a wavelength of at least a subset of radio frequency spectrum bands of the range of radio frequency spectrum bands;
  receiving control signaling indicating that the UE is configured to receive a positioning reference signal from the base station on a first radio frequency spectrum band of the subset of radio frequency spectrum bands;
  de-activating one or more antenna elements of the antenna module based at least in part on a wavelength of the first radio frequency spectrum band and the inter-antenna element spacing; and
  receiving the positioning reference signal via one or more active antenna elements of the antenna module.

9. The method of claim 8, further comprising:
  transmitting a request for the base station to increase transmission power of the positioning reference signal based at least in part on de-activating the one or more antenna elements.

10. The method of claim 8, further comprising:
transmitting a request for the base station to transmit positioning reference signals to the UE using a set of radio frequency spectrum bands that is different than the subset of radio frequency spectrum bands.

11. The method of claim 8, further comprising:
identifying that the inter-antenna element spacing of the antenna module of the UE is less than half the wavelength of the first radio frequency spectrum band; and
determining to increase the inter-antenna element spacing between active antenna elements of the antenna module of the UE by de-activating the one or more antenna elements based at least in part on the inter-antenna element spacing of the antenna module of the UE being less than half the wavelength of the first radio frequency spectrum band.

12. The method of claim 8, further comprising:
measuring a signal strength of the positioning reference signal received via the one or more active antenna elements of the antenna module; and
transmitting the signal strength of the positioning reference signal for downlink angle of departure estimation.

13. The method of claim 8, further comprising:
receiving, from a location management function, communications information associated with the positioning reference signal received by the UE, the communications information comprising a beam shape, a beam pattern, a peak or boresight direction of array gain, or an array gain pattern as a function of angles, or a combination thereof.

14. The method of claim 8, wherein transmitting the capability message further comprises:
transmitting an indication that mutual coupling will occur at the UE in the subset of radio frequency spectrum bands of the range of radio frequency spectrum bands based at least in part on the inter-antenna element spacing of the antenna module of the UE being less than half of the wavelength in at least the subset of radio frequency spectrum bands.

15. The method of claim 8, wherein transmitting the capability message further comprises:
transmitting an indication that the UE is capable of communications across the range of radio frequency spectrum bands via a single antenna module of the UE.

16. The method of claim 8, wherein transmitting the capability message further comprises:
transmitting an indication that the UE is capable of de-activating antenna elements of the antenna module of the UE.

17. An apparatus for wireless communications at a user equipment (UE), comprising:
a processor;
memory coupled with the processor; and
instructions stored in the memory and executable by the processor to cause the apparatus to:
transmit, to a base station, a capability message indicating that the UE is capable of communications across a range of radio frequency spectrum bands, wherein an inter-antenna element spacing of an antenna module of the UE is greater than half of a wavelength of at least a subset of radio frequency spectrum bands of the range of radio frequency spectrum bands;
transmit, to the base station, a request for the base station to transmit positioning reference signals to the UE using a set of radio frequency spectrum bands that is different than the subset of radio frequency spectrum bands; and
receive, from the base station, a first positioning reference signal via a first radio frequency spectrum band based at least in part on the request, wherein the first radio frequency spectrum band is included in the set of radio frequency spectrum bands.

18. The apparatus of claim 17, wherein the instructions are further executable by the processor to cause the apparatus to:
measure a signal strength of the first positioning reference signal received via the first radio frequency spectrum band; and
transmit the signal strength of the first positioning reference signal for downlink angle of departure estimation.

19. The apparatus of claim 17, wherein the instructions are further executable by the processor to cause the apparatus to:
receive, from the base station, a second positioning reference signal via a second radio frequency spectrum band, wherein the second radio frequency spectrum band is included in the subset of radio frequency spectrum bands.

20. The apparatus of claim 19, wherein the instructions are further executable by the processor to cause the apparatus to:
measure a signal strength of the first positioning reference signal received via the first radio frequency spectrum band and a signal strength of the second positioning reference signal received via the second radio frequency spectrum band; and
transmit the signal strength of the first positioning reference signal and the signal strength of the second positioning reference signal for downlink angle of departure estimation.

21. The apparatus of claim 19, wherein the instructions are further executable by the processor to cause the apparatus to:
measure a signal strength of the first positioning reference signal received via the first radio frequency spectrum band or a signal strength of the second positioning reference signal received via the second radio frequency spectrum band, or both;
measure a time-difference of arrival of the first positioning reference signal, a time-difference of arrival of the second positioning reference signal, or both; and
transmit an indication of a position of the UE relative to the base station based at least in part on the signal strength of the first positioning reference signal, the signal strength of the second positioning reference signal, the time-difference of arrival of the first positioning reference signal, the time-difference of arrival of the second positioning reference signal, or a combination thereof.

22. The apparatus of claim 19, wherein the instructions are further executable by the processor to cause the apparatus to:
receive, from a location management function, communications information associated with the first positioning reference signal, or the second positioning reference signal, or both, the communications information comprising a beam shape, a beam pattern, a peak or boresight direction of array gain, or an array gain pattern as a function of spatial angles, or a combination thereof.

23. The apparatus of claim 17, wherein the instructions are further executable by the processor to cause the apparatus to:

transmit an indication that beam weights used at the UE will result in grating lobes in the subset of radio frequency spectrum bands of the range of radio frequency spectrum bands based at least in part on the inter-antenna element spacing of the antenna module of the UE being greater than half of the wavelength in at least the subset of radio frequency spectrum bands.

24. The apparatus of claim 17, wherein the instructions are further executable by the processor to cause the apparatus to:

transmit an indication that the UE is capable of communications across the range of radio frequency spectrum bands via a single antenna module of the UE.

25. A method for wireless communications at a network device, comprising:

receiving a capability message from a user equipment (UE) indicating that the UE is capable of communications across a range of radio frequency spectrum bands, wherein an inter-antenna element spacing of an antenna module of the UE is greater than half of a wavelength of at least a subset of radio frequency spectrum bands of the range of radio frequency spectrum bands;

receiving, from the UE, a request for the network device to transmit positioning reference signals to the UE using a set of radio frequency spectrum bands that is different than the subset of radio frequency spectrum bands; and transmitting, to the UE, a first positioning reference signal via a first radio frequency spectrum band based at least in part on the request, wherein the first radio frequency spectrum band is included in the set of radio frequency spectrum bands.

26. The method of claim 25, further comprising:

transmitting, to the UE, a second positioning reference signal via a second radio frequency spectrum band, wherein the second radio frequency spectrum band is included in the subset of radio frequency spectrum bands.

27. The method of claim 26, further comprising:

receiving an indication of a position of the UE relative to the network device based at least in part on a signal strength of the first positioning reference signal, a signal strength of the second positioning reference signal, a time-difference of arrival of the first positioning reference signal, a time-difference of arrival of the second positioning reference signal, or a combination thereof.

28. The method of claim 25, wherein receiving the capability message further comprises:

receiving an indication that beam weights used at the UE will result in grating lobes in the subset of radio frequency spectrum bands of the range of radio frequency spectrum bands based at least in part on the inter-antenna element spacing of the antenna module of the UE being greater than half of the wavelength in at least the subset of radio frequency spectrum bands.

29. The method of claim 25, wherein receiving the capability message further comprises:

receiving an indication that mutual coupling will occur at the UE in a second subset of radio frequency spectrum bands of the range of radio frequency spectrum bands based at least in part on the inter-antenna element spacing of the antenna module of the UE being less than half of the wavelength in at least the second subset of radio frequency spectrum bands; and transmitting, to the UE, the first positioning reference signal via the first radio frequency spectrum band based at least in part on the indication that mutual coupling will occur at the UE in the second subset of radio frequency spectrum bands, the first radio frequency spectrum band included in the set of radio frequency spectrum bands different from the second subset of radio frequency spectrum bands.

30. The method of claim 25, wherein receiving the capability message further comprises:

receiving an indication that the UE is capable of communications across the range of radio frequency spectrum bands via a single antenna module of the UE.

* * * * *